(12) United States Patent
Fouli et al.

(10) Patent No.: US 11,424,861 B2
(45) Date of Patent: Aug. 23, 2022

(54) SYSTEM AND TECHNIQUE FOR SLIDING WINDOW NETWORK CODING-BASED PACKET GENERATION

(71) Applicants: Massachusetts Institute of Technology, Cambridge, MA (US); Code On Network Coding, LLC, Cambridge, MA (US); Technische Universität Dresden, Dresden (DE)

(72) Inventors: Kerim Fouli, Cambridge, MA (US); Frank Gabriel, Dresden (DE); Muriel Medard, Belmont, MA (US); Sreekrishna Pandi, Dresden (DE); Simon Wunderlich, Thossfell (DE)

(73) Assignees: Massachusetts Institute of Technology, Cambridge, MA (US); Code On Network Coding, LLC, Cambridge, MA (US); Technische Universität Dresden, Dresden (DE)

( * ) Notice: Subject to any disclaimer, the term of this patent is extended or adjusted under 35 U.S.C. 154(b) by 310 days.

(21) Appl. No.: 16/497,555

(22) PCT Filed: Mar. 29, 2018

(86) PCT No.: PCT/US2018/025168
§ 371 (c)(1),
(2) Date: Sep. 25, 2019

(87) PCT Pub. No.: WO2018/183694
PCT Pub. Date: Oct. 4, 2018

(65) Prior Publication Data
US 2020/0028624 A1 Jan. 23, 2020

Related U.S. Application Data

(60) Provisional application No. 62/478,114, filed on Mar. 29, 2017.

(51) Int. Cl.
*H04L 1/00* (2006.01)
*H04L 1/18* (2006.01)
*H04L 49/9057* (2022.01)

(52) U.S. Cl.
CPC .......... *H04L 1/0076* (2013.01); *H04L 1/0061* (2013.01); *H04L 1/1819* (2013.01); *H04L 49/9057* (2013.01)

(58) Field of Classification Search
CPC ... H04L 1/0076; H04L 1/0061; H04L 1/1819; H04L 49/9057
(Continued)

(56) References Cited

U.S. PATENT DOCUMENTS

| | | |
|---|---|---|
| 5,577,056 A | 11/1996 | Malik et al. |
| 5,870,412 A | 2/1999 | Schuster et al. |

(Continued)

FOREIGN PATENT DOCUMENTS

| | | |
|---|---|---|
| EP | 1 638 239 A1 | 3/2006 |
| WO | WO 2007/109216 A1 | 9/2007 |

(Continued)

OTHER PUBLICATIONS

Karzand et al: "Low delay random linear coding over a stream", 2014 52nd Annual Allerton Conference on Communication, Control, and Computing (Allerton), Sep. 1, 2015 (Sep. 1, 2015), XP055293611, ISBN: 978-1-4799-8009-3 https://arxiv.org/pdf/1509.00167v1.pdf (Year: 2015).*

(Continued)

*Primary Examiner* — Kwang B Yao
*Assistant Examiner* — Xuan Lu
(74) *Attorney, Agent, or Firm* — Daly, Crowley, Mofford & Durkee, LLP

(57) ABSTRACT

A method and apparatus decode packetized data in the presence of packet erasures using a finite sliding window (Continued)

technique. A decoder receives packets containing uncoded and coded symbols. When a packet with a coded symbol is received, the decoder determines whether a packet sequence number is within a sliding window of w consecutive sequence numbers that are no greater than a decoder sequence number, where the number w is fixed prior to encoding. When this is the case, the decoder decodes the coded symbol into one or more of the w input symbols using the coefficient vector. Decoding may use a forward error correcting (FEC) window within the finite sliding window. Decoding also may use a technique of Gaussian elimination to produce a "shifted" row echelon coefficient matrix.

23 Claims, 15 Drawing Sheets

(58) Field of Classification Search
USPC .......................................................... 370/394
See application file for complete search history.

(56) References Cited

U.S. PATENT DOCUMENTS

| | | | |
|---|---|---|---|
| 6,128,773 A | 10/2000 | Snider | |
| 6,621,851 B1 | 9/2003 | Agee et al. | |
| 6,885,653 B2 | 4/2005 | Choi et al. | |
| 7,064,489 B2 | 6/2006 | Price | |
| 7,071,853 B2 | 7/2006 | Price | |
| 7,095,343 B2 | 8/2006 | Xie et al. | |
| 7,164,691 B2 | 1/2007 | Knapp et al. | |
| 7,283,564 B2 | 10/2007 | Knapp et al. | |
| 7,349,440 B1 | 3/2008 | Chou et al. | |
| 7,408,938 B1 * | 8/2008 | Chou | H04H 20/42 370/394 |
| 7,414,978 B2 | 8/2008 | Lun et al. | |
| 7,529,198 B2 | 5/2009 | Jain et al. | |
| 7,706,365 B2 | 4/2010 | Effros et al. | |
| 7,760,728 B2 | 7/2010 | Chou et al. | |
| 7,821,980 B2 | 10/2010 | Chakrabarti et al. | |
| 7,876,677 B2 | 1/2011 | Cheshire | |
| 7,912,003 B2 | 3/2011 | Radunovic et al. | |
| 7,930,617 B1 | 4/2011 | Gass et al. | |
| 7,945,842 B2 | 5/2011 | He | |
| 8,040,836 B2 | 10/2011 | Wu et al. | |
| 8,068,426 B2 | 11/2011 | Sundararajan et al. | |
| 8,130,776 B1 * | 3/2012 | Sundararajan | H04L 47/27 370/401 |
| 8,279,781 B2 | 10/2012 | Lucani et al. | |
| 8,451,756 B2 | 5/2013 | Lucani et al. | |
| 8,482,441 B2 | 7/2013 | Medard et al. | |
| 8,504,504 B2 | 8/2013 | Liu | |
| 8,571,214 B2 | 10/2013 | Lima et al. | |
| 8,780,693 B2 | 7/2014 | Kim et al. | |
| 9,019,643 B2 | 4/2015 | Medard et al. | |
| 9,025,607 B2 | 5/2015 | Zeger et al. | |
| 9,137,492 B2 | 9/2015 | Lima et al. | |
| 9,143,274 B2 | 9/2015 | Zeger et al. | |
| 9,160,687 B2 | 10/2015 | Haeupler et al. | |
| 9,185,529 B2 | 11/2015 | Medard et al. | |
| 9,253,608 B2 | 2/2016 | Medard et al. | |
| 9,271,123 B2 | 2/2016 | Medard et al. | |
| 9,294,113 B2 | 3/2016 | Feizi-Khankandi et al. | |
| 9,361,936 B2 | 6/2016 | Medard et al. | |
| 9,369,255 B2 | 6/2016 | Medard et al. | |
| 9,369,541 B2 | 6/2016 | Medard et al. | |
| 9,537,759 B2 | 1/2017 | Calmon et al. | |
| 9,544,126 B2 | 1/2017 | Zeger et al. | |
| 9,559,831 B2 | 1/2017 | Zeger et al. | |
| 9,607,003 B2 | 3/2017 | Medard et al. | |
| 2003/0055614 A1 | 3/2003 | Pelikan | |
| 2003/0214951 A1 | 11/2003 | Joshi et al. | |
| 2004/0001494 A1 | 1/2004 | Barrack et al. | |
| 2004/0062248 A1 | 4/2004 | Nagarajan et al. | |
| 2004/0203752 A1 | 10/2004 | Wojaczynski et al. | |
| 2005/0010675 A1 | 1/2005 | Jaggi et al. | |
| 2005/0078653 A1 | 4/2005 | Agashe et al. | |
| 2005/0152391 A1 | 7/2005 | Effros et al. | |
| 2005/0251721 A1 | 11/2005 | Ramesh et al. | |
| 2006/0020560 A1 | 1/2006 | Rodriguez et al. | |
| 2006/0146791 A1 | 7/2006 | Deb et al. | |
| 2006/0224760 A1 | 10/2006 | Yu et al. | |
| 2007/0046686 A1 | 3/2007 | Keller | |
| 2007/0116027 A1 | 5/2007 | Ciavaglia et al. | |
| 2007/0274324 A1 | 11/2007 | Wu et al. | |
| 2008/0043676 A1 | 2/2008 | Mousseau et al. | |
| 2008/0049746 A1 | 2/2008 | Morrill et al. | |
| 2008/0104488 A1 | 5/2008 | Cheng | |
| 2008/0123579 A1 | 5/2008 | Kozat et al. | |
| 2008/0259796 A1 | 10/2008 | Abousleman et al. | |
| 2008/0291834 A1 | 11/2008 | Chou et al. | |
| 2008/0320363 A1 | 12/2008 | He | |
| 2009/0003216 A1 | 1/2009 | Radunovic et al. | |
| 2009/0135717 A1 | 5/2009 | Kamal et al. | |
| 2009/0153576 A1 | 6/2009 | Keller | |
| 2009/0175320 A1 | 7/2009 | Haustein et al. | |
| 2009/0198829 A1 | 8/2009 | Sengupta et al. | |
| 2009/0207930 A1 | 8/2009 | Sirkeci et al. | |
| 2009/0238097 A1 | 9/2009 | Le Bars et al. | |
| 2009/0248898 A1 | 10/2009 | Gkantsidis et al. | |
| 2009/0285148 A1 | 11/2009 | Luo et al. | |
| 2009/0310582 A1 | 12/2009 | Beser | |
| 2009/0313459 A1 | 12/2009 | Horvath | |
| 2009/0316763 A1 | 12/2009 | Erkip et al. | |
| 2010/0014669 A1 | 1/2010 | Jiang | |
| 2010/0046371 A1 | 2/2010 | Sundararajan et al. | |
| 2010/0054164 A1 | 3/2010 | Lucani et al. | |
| 2010/0057636 A1 | 3/2010 | Brennan | |
| 2010/0111165 A1 | 5/2010 | Kim et al. | |
| 2010/0146357 A1 | 6/2010 | Larsson | |
| 2011/0238855 A1 | 9/2011 | Korsunsky et al. | |
| 2011/0243324 A1 | 10/2011 | Lima et al. | |
| 2012/0218891 A1 | 8/2012 | Sundararajan et al. | |
| 2012/0300692 A1 | 11/2012 | Sfar et al. | |
| 2013/0077501 A1 | 3/2013 | Krishnaswamy et al. | |
| 2013/0107764 A1 | 5/2013 | Zeger et al. | |
| 2013/0114481 A1 | 5/2013 | Kim et al. | |
| 2013/0114611 A1 | 5/2013 | Zeger et al. | |
| 2013/0195106 A1 * | 8/2013 | Calmon | H04L 69/14 370/389 |
| 2015/0256354 A1 | 9/2015 | Zeger et al. | |
| 2015/0372809 A1 | 12/2015 | Lima et al. | |
| 2016/0006676 A1 | 1/2016 | Haeupler et al. | |
| 2016/0154970 A1 | 6/2016 | Calmon et al. | |
| 2016/0157127 A1 | 6/2016 | Zeger et al. | |
| 2016/0302134 A1 | 10/2016 | Kim et al. | |

FOREIGN PATENT DOCUMENTS

| | | |
|---|---|---|
| WO | WO 2010/005181 A2 | 1/2010 |
| WO | WO 2010/005181 A3 | 1/2010 |
| WO | WO 2010/025362 A2 | 3/2010 |
| WO | WO 2010/025362 A3 | 3/2010 |
| WO | WO 2011/043754 A1 | 4/2011 |
| WO | WO 2011/119909 A1 | 9/2011 |
| WO | WO 2012/167034 A2 | 12/2012 |
| WO | WO 2013/006697 A2 | 1/2013 |
| WO | WO 2013/067488 A1 | 5/2013 |
| WO | WO 2013/116456 A1 | 8/2013 |
| WO | WO2014/078596 | 5/2014 |
| WO | WO 2014/159570 A1 | 10/2014 |
| WO | WO 2014/160194 A3 | 10/2014 |

OTHER PUBLICATIONS

U.S. Appl. No. 15/427,536, filed Feb. 8, 2017, Medard et al.
U.S. Appl. No. 15/358,776, filed Nov. 22, 2016, Calmon, et al.
PCT International Search Report and Written Opinion of the ISA for Appl. No. PCT/US2013/24039 dated Apr. 12, 2013.
PCT International Search Report of the ISA for PCT/US2009/055359 dated Mar. 30, 2011.

(56) References Cited

OTHER PUBLICATIONS

PCT Written Opinion of the ISA for PCT/US2009/055359 dated Mar. 30, 2011.
International Preliminary Report on Patentability of the ISA for PCT/US2009/055359 dated Apr. 12, 2011.
U.S. Pat. No. 8,279,781 issued on Oct. 2, 2012 (Lucani et al.); Part 1 of 3.
U.S. Pat. No. 8,279,781 issued on Oct. 2, 2012 (Lucani et al.); Part 2 of 3.
U.S. Pat. No. 8,279,781 issued on Oct. 2, 2012 (Lucani et al.); Part 3 of 3.
U.S. Pat. No. 8,451,756 issued on May 28, 2013 (Lucani et al.); Part 1 of 4.
U.S. Pat. No. 8,451,756 issued on May 28, 2013 (Lucani et al.); Part 2 of 4.
U.S. Pat. No. 8,451,756 issued on May 28, 2013 (Lucani et al.); Part 3 of 4.
U.S. Pat. No. 8,451,756 issued on May 28, 2013 (Lucani et al.); Part 4 of 4.
PCT International Preliminary Report on Patentability with Written Opinion for PCT/US2013/024039 dated Aug. 5, 2014 7 Pages.
European Extended Search Report dated Aug. 7, 2015 corresponding to European Application No. 13742964.3; 11 Pages.
Tomozei et al., "First Report on Novel Protocol Components with Network Coding;" Network Coding for Robust Architectures in Volatile Environments: Collaborate Project, No. 215252; Submitted Jan. 15, 2010; 78 Pages.
Zhuoqun et al., "An Improved MPTCP in Coded Wireless Mesh Networks;" Proceedings of the $2^{nd}$ IEEE International Conference on Broadband Network and Multimedia Technology; Oct. 18, 2009; 6 Pages.
Response (with Amended Claims) to European Office Action dated Apr. 8, 2016 corresponding to European Application No. 13742964.3; Response filed on Jun. 20, 2016; 12 Pages.
U.S. Non-Final Office Action dated Jun. 30, 2015 corresponding to U.S. Appl. No. 13/754,398; 29 Pages.
Response to U.S. Non-Final Office Action dated Jun. 30, 2015 corresponding to U.S. Appl. No. 13/754,398; Response filed Oct. 29, 2015; 13 Pages.
U.S. Final Office Action dated Feb. 16, 2016 corresponding to U.S. Appl. No. 13/754,398; 21 Pages.
Response to U.S. Final Office Action dated Feb. 16, 2016 corresponding to U.S. Appl. No. 13/754,398; Response filed on Aug. 12, 2016; 7 Pages.
Notice of Allowance dated Aug. 25, 2016 corresponding to U.S. Appl. No. 13/754,398; 8 Pages.
Response to Communication under Rule 71 (3) dated Aug. 8, 2017 from European Patent Application No. 13742964.3 as filed on Nov. 20, 2017; 6 Pages.
Communication Under Rule 71(3) EPC dated Dec. 14, 2017 from European Appl. No. 13742964.3; 66 Pages.
U.S. Non-Final Office Action dated Jul. 27, 2017 for U.S. Appl. No. 15/358,776; 55 Pages.
Response to U.S. Non-Final Office Action dated Jul. 27, 2017 for U.S. Appl. No. 15/358,776; Response filed on Oct. 27, 2017; 18 pages.
Notice of Allowance dated Mar. 7, 2018 for U.S. Appl. No. 15/358,776; 21 pages.
PCT International Preliminary Report on Patentability dated Oct. 1, 2019 for International Application No. PCT/US2018/025168; 9 Pages.
Bilbao et al., "Network Coding in the Link Layer for Reliable Narrowband Powerline Communications;" Proceedings of the IEEE Journal on Selected Areas in Communications, vol. 34, No. 7; Jul. 2016; 13 Pages.
Cloud et al., "Multi-Path Low Delay Network Codes;" IEEE Global Communications Conference (GLOBECOM) 2016; Sep. 2016; pp. 272-285; 7 Pages.
Cloud et al., "Network Coding Over SATCOM: Lessons Learned;" International Conference on Wireless and Satellite Systems, vol. 154; Jun. 2015; 14 Pages.
Karafillis et al., "An Algorithm for Improving Sliding Window Network Coding in TCP;" $47^{th}$ Annual Conference on Information Sciences and Systems (CISS); Mar. 2013; 5 Pages.
Karzand et al., "Low Delay Random Linear Coding Over a Stream;" 52nd Annual Allerton Conference on Communication, Control, and Computing; Sep. 30, 2014; 14 Pages.
Kim et al., "Network Coded TCP (CTCP);" ACM Mobicom 2013; Last Revised Apr. 12, 2013; 12 Pages.
Roca et al., "Block or Convolutional AL-FEC Codes? A Performance Comparison for Robust Low-Latency Communications;" PRIVATICS—Privacy Models, Architectures and Tools for the Information Society; Feb. 20, 2017; 7 Pages.
Sundararajan et al., "Network Coding Meets TCP;" Proceedings of IEEE INFOCOM; Oct. 2008; pp. 280-288; 9 Pages.
PCT International Search Report and Written Opinion dated Jul. 12, 2018 for International Application No. PCT/US2018/025168; 17 Pages.
Examination Report dated Nov. 10, 2020 for European Application No. 18720064.7; 5 pages.
"Data Service Options for Spread Spectrum Systems: Radio Link Protocol Type 3;" 3GPP2 C.S0017-010-A; Version 2.0; Sep. 2005.
"Guest Editorial Wireless Video Transmission;" IEEE Journal on Selected Areas in Communications; vol. 28; No. 3; Apr. 2010; pp. 297-298.
Abichar, et al.; "WiMax vs. LTE: Who Will Lead the Broadband Mobile Internet?;" Mobile Computing; IEEE Computer Society; IT Pro May/Jun. 2010; pp. 26-32.
AbuZeid, et al.; "IR-HARQ vs. Joint Channel-Network Coding for Cooperative Wireless Communication;" Cyber Journals: Multidisciplinary Journals in Science and Technology, Journal of Selected Areas in Telecommunications (JSAT); Aug. 2011; pp. 39-43.
Acedanski, et al.; "How Good is Random Linear Coding Based Distributed Network Storage?;" Proc. $1^{st}$ Workshop on Network Coding, Theory, and Applications (Netcod'05); Apr. 2005; 6 pages.
Adamson, et al.; "Multicast Negative-Acknowledgment (NACK) Building Blocks;" Internet Engineering Task Force (IETF),RFC; vol. 5401; Nov. 2008; 42 pages.
Adamson, et al.; "NACK-Oriented Reliable (NORM) Transport Protocol;" Internet Engineering Task Force (IETF); RFC; vol. 5740; Nov. 2009; 94 pages.
Adamson, et al.; "Quantitative Prediction of NACK-Oriented Reliable Multicast (NORM) Feedback;" Proceedings, MILCOM 2000; vol. 2; Oct. 2002; 6 pages.
Ahiswede, et al.; "Network Information Flow;" IEEE Transactions on Information Theory; vol. 46; No. 4; Jul. 2000; pp. 1204-1216.
Ahmed, et al.; "On the Scaling Law of Network Coding Gains in Wireless Networks;" IEEE; MILCOM 2007; Oct. 2007; 7 pages.
Allman, et al.; "Fast Retransmit / Fast Recovery—TCP Congestion Control;" IETF; Section 3.2; RFC 2581; http://tools.ietf.org/html/rfc2581#section-3.2; Apr. 1999; downloaded on Nov. 2, 2011; 14 pages.
Armstrong, et al.; "Distributed Storage with Communcation Costs;" IEEE Forty-Ninth Annual Allerton Conference—Allerton House; Sep. 28-30, 2011; pp. 1358-1365.
Awerbuch, et al.; "On-Line Generalized Steiner Problem;" Proceedings of the $7^{th}$ Annual ACM-SIAM Symposium on Discrete Algorithms; pp. 1-12; 1996.
Baek, et al.; "The International Journal of Computer and Telecommunications Networking;" vol. 56; Issue 6; Apr. 2012; pp. 1745-1762.
Baron, et al.; "Coding Schemes for Multislot Messages in Multichannel ALOHA With Deadlines;" IEEE Transactions on Wireless Communications; vol. 1; No. 2; Apr. 2002; pp. 292-301.
Bellare, et al.; "A Concrete Security Treatment of Symmetric Encryption: Analysis of the DES Modes of Operation;" Proc. $38^{th}$ Annual Symposium on Foundations of Computer Science; Oct. 1997; pp. 1-32.
Berman, et al.; "Improved Approximations for the Steiner Tree Problem;" Jorunal of Algorithms; Chapter 39; pp. 325-334.

(56) References Cited

OTHER PUBLICATIONS

Bhadra, et al.; "Looking at Large Networks: Coding vs. Queuing;" Proc. of the 25$^{th}$ IEEE International Conference on Computer Communications (INFOCOM); Apr. 2006; 12 pages.
Bharath-Kumar, et al.; "Routing to Multiple Destinations in Computer Networks;" IEEE Transactions on Communications; vol. Com-31; No. 3; Mar. 1983; pp. 343-351.
Bhargava, et al.; "Forward Error Correction Coding;" Mobile Communications Handbook; Part 1: Basic Principals; 1999; 18 pages.
Birk, et al.; "Judicious Use of Redundant Transmissions in Multichannel ALOHA Networks with Deadlines;" IEEE Journal on Selected Areas in Communications; vol. 17; No. 2; Feb. 1999; pp. 257-269.
Bisson, et al.; "Reducing Hybrid Disk Write Latency with Flash-Backed I/O Requests;" Proceedings of the Fifteenth IEEE International Symposium on Modeling, Analysis, and Simulation of Computer and Telecommunications Systems (MASCOTS'07); Oct. 2007; pp. 402-409.
Bonnin, et al.; "Automatic Multi-Interface Management Through Profile Handling;" Springer; Mobile Networks and Applications; Feb. 2009; pp. 4-17.
Borokhovich, et al.; "Tight bounds for Algebraic Gossip on Graphs;" Proc. of the IEEE International Symposium on Information Theory (ISIT); Jun. 13-18, 2010; 14 pages.
Borst, et al.; "Distributed Caching Algorithms for Content Distribution Networks"; IEEE INFOCOM; 2010 Proceedings IEEE; Mar. 14-19, 2010; 9 pages.
Borst, et al.; "Distributed Caching Algorithms for Content Distribution Networks;" Power Point Presentation; BCAM Seminar; Bilbao, Sep. 30, 2010; 36 pages.
Bui, et al.; "A Markovian Approach to Multipath Data Transfer in Overlay Networks;" IEEE Transactions on Parallel and Distributed Systems; vol. 21; No. 10; Oct. 2010; pp. 1398-1411.
Cai, et al.; "Secure Network Coding;" IEEE; ISIT; Jun. 30-Jul. 5, 202; p. 323.
Calmon, et al.; "Network Coding Over Multiple Network Interfaces Using TCP;" Presentation; Information Theory and Applications Workshop (ITA) 2012; San Diego, CA; Feb. 5, 2012; 55 pages.
Cardinal, et al; "Minimum Entropy Combinatorial Optimization Problems;" Data Structure and Algorithms, Discrete Mathematics; Aug. 17, 2010; pp. 1-16.
Castro, et al.; "Upper and Lower Error Bounds for Active Learning;" The 44'th Annual Allerton Conference on Communication, Control and Computing; vol. 2, No. 2.1; 2006, 10 pages.
Celik, et al.; "MAC for Networks with Multipacket Reception Capability and Spatially Distributed Nodes;" Proc. IEEE INFOCOM 2008; Apr. 2008; 9 pages.
Celik; "Distributed MAC Protocol for Networks with Multipacket Reception Capability and Spatially Distributed Nodes;" Master's Thesis; MIT Department of Electrical Engineering and Computer Science; May 2007; 127 pages.
Cha, et al.; "I Tube, You Tube, Eveybody Tubes: Analyzing the World's Largest User Generated Content Video System;" 7$^{th}$ ACM GIGCOMM Conference on Internet Measurement; IMC'07; Oct. 24-26, 2007; 13 pages.
Chakrabarti, et al.; "Approximation Algorithms for the Unsplittable Flow Problem;" Proceedings of the 5$^{th}$ International Workshop on Approximation Algorithms for Combinatorial Optimization; Sep. 2005, pp. 1-27.
Chakrabarti, et al.; Approximation Algorithms for the Unsplittable Flow Problem; Algorithmica (2007); Springer Science—Business Media, Aug. 2006; 16 pages.
Charikar, et al.; "Approximation Algorithms for Directed Steiner Problems;" Proceedings of the 9$^{th}$ ACM-SIAM Symposium on Discrete Algorithms, pp. 1-15; 1998.
Chen, et al.; "Pipeline Network Coding for Multicast Streams;" ICMU Org.; 2010; 7 pages.
Chou, et al.; "FEC and Pseudo-ARQ for Receiver-driven Layered Multicast of Audio and Video;" Data Compression Conference (DCC), 2000; Proceedings; Jan. 2000; 10 pages.

Chou, et al.; "Practical Network Coding;" Proceedings of the 41$^{st}$ Annual Allerton Conference on Communication, Control, and Computing; Oct. 2003; 10 pages.
Cisco Visual Networking Index: Forecast and Methodology; 2009-2014; White Paper; Jun. 2, 2010; pp. 1-17.
Cloud, et al.; "Co-Designing Multi-Packet Reception, Network Coding, and MAC Using a Simple Predictive Model;" arXiv:1101.5779v1 [cs.NI]; Submitted to W.Opt 2011;Jan. 30, 2011; pp. 1-8.
Cloud, et al.; "Effects of MAC approaches on non-monotonic saturation with COPE—a simple case study;" Military Communication Conference, 2011—MILCOM; Aug. 11, 2011; 7 pages.
Cloud, et al.; "MAC Centered Cooperation—Synergistic Design of Network Coding, Multi-Packet Reception, and Improved Fairness to Increase Network Throughput;" IEEE Journal on Selected Areas in Communications; vol. 30; No. 2; Feb. 2012; pp. 1-8.
Cloud, et al.; "Multi-Path TCP with Network Coding;" Wireless@mit—MIT Center for Wireless Networks and Mobile Computing; 2012 Inaugural Retreat; Oct. 10-11, 2012.
Cloud, et al; U.S. Appl. No. 13/654,953, filed Oct. 18, 2012.
Costa, et al.; "Informed Network Coding for Minimum Decoding Delay;" Fifth IEEE International Conference on Mobile Ad-hoc and Sensor Systems; Sep. 2008; pp. 80-91.
Coughlin, et al.; Years of Destiny: HDD Capital Spending and Technology Developments from 2012-2016; IEEE Santa Clara Valley Magnetics Society; Jun. 19, 2012; pp. 1-28.
Dana, et al.; "Capacity of Wireless Erasure Networks;" IEEE Transactions on Information Theory; vol. 52; No. 3; Mar. 2006; pp. 789-804.
Dana, et al.; "Capacity of Wireless Erasure Networks;" Jan. 2006; 41 pages.
Deb, et al.; "Algebraic Gossip: A Network Coding Approach to Optimal Multiple Rumor Mongering;" Proc. of the 42$^{nd}$ Allerton Conference on Communication, Control, and Computing; Jan. 2004; 10 pages.
Deb, et al.; "On Random Network Coding Based Information Dissemination;" Proc. of the IEEE International Symposium on Information Theory (ISIT); Sep. 4-9, 2005; 5 pages.
Demers, et al.; "Epidemic Algorithms for Replicated Database Maintenance;" PODC '87 Proceedings of the sixth annual ACM Symposium on Principles of distributed computing; Jan. 1987; pp. 1-12.
Dias, et al.; "Performance Analysis of HARQ in WiMax Networks Considering Imperfect Channel Estimation;" The 7th International Telecommunications Symposium (ITS 2010); 2010; 5 pages.
Dimakis, et al.; "A Survey on Network Codes for Distributed Storage;" Proceedings of the IEEE; vol. 99; No. 3; Mar. 2011; pp. 476-489.
Dimakis, et al.; "Network Coding for Distributed Storage Systems;" IEEE/ACM Transactions on Information Theory; vol. 56; No. 9; pp. 1-13.
Donoho, et al.; "Estimating Covariances of Locally Stationary Processes: Rates of Convergence of Best Basis Methods;" Statistics, Stanford University, Stanford, California, USA, Tech. Rep; 1998; pp. 1-64.
Effros; Distortion-Rate Bounds for Fixed-and Variable-Rate Multiresolution Source Codes; IEEE Transactions on Information Theory; vol. 45, No. 6; Sep. 1999; pp. 1887-1910.
Effros; "Universal Multiresolution Source Codes;" IEEE Transactions on Information Theory; vol. 47; No. 6; Sep. 2001; pp. 2113-2129.
El Bahri, et al.; "Performance Comparison of Type I, II and III Hybrid ARQ Schemes over AWGN Channels;" 2004 IEEE International Conference on Industrial Technology (ICIT); vol. 3; Dec. 8-10, 2004; pp. 1417-1421.
Eryilmaz, et al.; On Delay Performance Gains From Network Coding; Information Sciences and Systems; 2006 40th Annual Conference on Mar. 22-24, 2006; 7 pages.
Fan, et al.; "Reliable Relay Assisted Wireless Multicast Using Network Coding;" IEEE Journal on Selected Areas in communications; vol. 27; No. 5; Jun. 2009; pp. 749-762.
Feizi, et al.; "Locally Adaptive Sampling;" Communication, Control, and Computing; 2010; 48th Annual Allerton Conference, IEEE; Sep. 29, 2010; pp. 152-159.

(56) References Cited

OTHER PUBLICATIONS

Feizi, et al.; "On Network Functional Compression;" arXiv online repository; URL: http://arxiv.org/pdf/1011.5496v2.pdf; Nov. 30, 2010p pp. 1-60.
Feizi, et al.; "When Do Only Sources Need to Compute? On Functional Compression in Tree Networks;" 47th Annual Allerton Conference, IEEE; Sep. 30, 2009; pp. 447-454.
Feizi, et al; "Cases Where Finding a Minimum Entrophy Coloring of a Characteristic Graph is a Polynomial Time Problem;" IEEE International Symposium on Information Theory; Jun. 13, 2010; pp. 116-120.
Ferner, et al.; "Toward Sustainable Networking: Storage Area Networks with Network Coding;" Fiftieth Annual Allerton Conference; IEEE; Oct. 1-5, 2012; pp. 517-524.
Ford; "Architectural Guidelines for Multipath TCP Development;" Internet Engineering Task Force; Internet-Draft; Dec. 8, 2010; 17 pages.
Ford; "TCP Extension for Multipath Operation with Multiple Addresses draft-ford-mptcp-multiaddressed-03;" Internet Engineering Task Force; Internet-Draft; Mar. 8, 2010; 35 pages.
Fragouli, et al.; "Wireless Network Coding: Opportunities & Challenges;" MILCOM; Oct. 2007; 8 pages.
Frossard, et al.; "Media Streaming With Network Diversity;" Invited Paper; Proceedings of the IEEE; vol. 96, No. 1; Jan. 2008; pp. 39-53.
Galbraith, et al.; (HGST); "Iterative Detection Read Channel Technology in Hard Disk Drives;" Whitepaper; Nov. 2008; 8 pages.
Garcia-Luna-Aceves; "Challenges: Towards Truly Scalable Ad Hoc Networks;" MobiCom 2007; Sep. 2007; pp. 207-214.
Garcia-Luna-Aceves; "Extending the Capacity of Ad Hoc Networks Beyond Network Coding;" IWCMC 07; Proceedings of the 2007 International Conference on Wireless Communications and Mobile Computing; ACM; 2007; pp. 91-96.
Ghaderi, et al.; Reliability Gain of Network Coding in Lossy Wireless Networks; Infocom 2008; The 27th Conference on Computer Communications IEEE; Apr. 13-18, 2008; 5 pages.
Gheorghiu, et al.; "Multipath TCP with Network Coding for Wireless Mesh Networks;" IEEE Communications (ICC) 2010 International Conference; May 23-27, 2010; 5 pages.
Gheorghiu, et al.; "On the Performance of Network Coding in Multi-Resolution Wireless Video Streaming;" IEEE International Symposium on Jun. 9-11, 2010; 6 pages.
Ghez, et al.; "Stability Properties of Slotted Aloha with Multipacket Reception Capability;" IEEE Transactions on Automatic Control; vol. 33; No. 7; Jul. 1988; pp. 640-649.
Gkantsidis, et al.; "Cooperative Security for Network Coding File Distribution;" Proc. IEEE Infocom; Apr. 2006; 13 pages.
Gollakota, et al.; "ZigZag Decoding: Combating Hidden Terminals in Wireless Networks;" SIGCOMM Aug. 17-22, 2008; pp. 159-170.
Golrezaei, et al.; "FemtoCaching: Wireless Video Content Delivery Through Distributed Caching Helpers;" arXiv:1109.4179v2; Apr. 7, 2012; pp. 1-11.
Grant, et al.; "Graph Implementation for Nonsmooth Convex Programs;" LNCIS 371; Springer-Verlag Limited; Jan. 2008; pp. 95-110.
Gupta; "The Capacity of Wireless Networks;" IEEE Transactions on Information Theory; vol. 46; No. 2; Mar. 2000; pp. 388-404.
Hadzi-Velkov, et al.; "Capture Effect in IEEE 802.11 Basic Service Area Under Influence of Rayleigh Fading and Near/Far Effect;" IEEE; PIMRC 202; vol. 1; Sep. 2002; 5 pages.
Haeupler, et al.; "One Packet Suffices—Highly Efficient Packetized Network Coding With Finite Memory;" IEEE International Symposium on Information Theory (ISIT) Proceedings; Jul. 31, 2011-Aug. 5, 2011; 5 pages.
Haeupler; "Analyzing Network Coding Gossip Made Easy;" Proc. of the 43rd Symposium on Theory of Computing (STOC); Jan. 2011, 13 pages.
Haeupler, et al.; "Optimality of Network Coding in Packet Networks;" ArXiv, Feb. 17, 2011; 5 pages.

Haley, et. al.; "Reversible Low-Density Parity-Check Codes;" IEEE Transactions on Information Theory; vol. 55; No. 5; May 2009; pp. 2016-2036.
Halloush, et al.; "Network Coding with Multi-Generation Mixing: Analysis and Applications for Video Communication;" IEEE International Conference on Communications; May 19, 2008; pp. 198-202.
Han, et al.; "Multi-Path TCP: A Joint Congestion Control and Routing Scheme to Exploit Path Diversity in the Internet;" IEEE/ACM Transactions on Networking (TON); vol. 14; No. 6, Dec. 2006; 26 pages.
Han, et al.; "On Nework Coding for Security;" IEEE Military Communications Conference; Oct. 2007; pp. 1-6.
Hassner, et al.; "4K Bye-Sector HDD-Data Format Standard;" Windows Hardware and Driver Central; San Jose, CA; Aug. 14, 2013; 5 pages.
Ho, et al.; "A Random Linear Network Coding Approach to Multicast;" IEEE Transactions on Information Theory; vol. 52; No. 10; Oct. 2006, pp. 4413-4430.
Ho, et al.; "Byzantine Modification Detection in Multicast Networks using Randomized Network Coding;" IEEE; ISIT; Jun. 27-Jul. 2, 2004; p. 144.
Ho, et al.; "Network Coding from a Network Flow Perspective;" ISIT; Jun.-Jul. 2003; 6 pages.
Ho, et al.; "On Randomized Network Coding;" Proceedings of 41st Annual Allerton Conference on Communications, Control and Computing; Oct. 2003; 10 pages.
Ho, et al.; "On the utility of network coding in dynamic environments;" International Workshop on Wireless AD-HOC Networks (IWWAN); 2004; pp. 1-5.
Ho, et al.; "The Benefits of Coding over Routing in a Randomized Setting;" Proceedings of 2003 IEEE International Symposium on Information Theory; Jun. 2003; pp. 1-6.
Ho, et al.; "The Benefits of Coding over Routing in a Randomized Setting;" IEEE; ISIT Jun. 29-Jul. 4, 2003; p. 442.
Hofri; "Disk Scheduling: FCFS vs. SSTF Revisited;" Communications of the ACM; vol. 23; No. 11; Nov. 1980; pp. 645-653.
Hong, et al.; Network-coding-based hybrid ARQ scheme for mobile relay networks; Electronics Letters; vol. 46; No. 7; Apr. 1, 2010; 2 pages.
International Disk Drive Equipment and Materials Assoc.; "Advanced Standard;" in Windows Hardware Engineering Conf.; May 2005; 11 pages.
Iyer, et al.; "Anticipatory scheduling: A disk scheduling framework to overcome deceptive idleness in synchronous I/O;" SIGOPS Operating Sys. Review; vol. 35; No. 5; Dec. 2001; 14 pages.
Jacobson, et al.; "Disk scheduling algorithms based on rotational position;" Hewlett-Packard laboratories; Palo Alto, CA; Technical Report HPL-CSP-91-7rev1; Feb. 26, 1991; 17 pages.
Jaggi, et al.; "Low Complexity Algebraic Multicast Network Codes;" Proceedings of the IEEE International Symposium on Information Theory; Jul. 4, 2003; 1 page.
Jaggi, et al.; "Resilient Network Coding in the Presence of Byzantine Adversaries;" Proc. IEEE INFOCOM; May 2007; 9 pages.
Jakubczak, et al.; "One-Size-Fits-All Wireless Video;" ACM SigComm Hotnets 2009; 6 pages.
Jamieson, et al.; "PPR: Partial Packet Recovery for Wireless Networks;" SIGCOMM 07; Aug. 27-31, 2007; 12 pages.
Jamieson, et al.; "PPR: Partial Packet Recovery for Wireless Networks;" Presentation; SIGCOMM 07; Aug. 27-31, 2007; 25 pages.
Jannaty, et al.; "Full Two-Dimensional Markov Chain Analysis of Thermal Soft Errors in Subthreshold Nanoscale CMOS Devices;" IEEE Transactions on Device and Materials Reliability; vol. 11; No. 1; Mar. 2011; pp. 50-59.
Ji, et. al; "A network coding based hybrid ARQ algorithm for wireless video broadcast;" Science China; Information Sciences; vol. 54; No. 6; Jun. 2011; pp. 1327-1332.
Jin, et al.; "Adaptive Random Network Coding in WiMAX;" Communications, 2008; ICC'08 IEEE International Conference on May 19-23, 2008; 5 pages.
Jin, et al.; "Is Random Network Coding Helpful in WiMax;" IEEE 27th Conference on Computer Communications; Apr. 2008; 5 pages.

(56) References Cited

OTHER PUBLICATIONS

Jolfaei, et al.; "A New Efficient Selective Repeat Protocol for Point-To_Multipoint Communication;" Communications 1993; ICC'93 Genova Technical Program, Conference Record; IEEE International Conference on May 23-26, 1993; vol. 2; pp. 1113-1117.

Karkpinski, et al.; "New Approximation Algorithms for the Steiner Tree Problems;" Technical Report, Electronic Colloquium on Computational Complexity (ECCC) TR95-030; 1995; pp. 1-17.

Karp, et al.; "Randomized Rumor Spreading;" IEEE Proceeding FOCS '00 Proceedings of the 41st Annual Symposium on Foundations of Computer Science; Jan. 2000; pp. 565-574.

Katti, et al.; "XORs in the Air: Practical Wireless Network Coding;" IEEE/ACM Transactions on Networking; vol. 16; No. 3; 2008; pp. 1-14.

Katti, et al.; "XORs in the Air: Practical Wireless Network Coding;" ACM SIGCOMM '06; Computer Communications Review; vol. 36; Sep. 11-15, 2006; 12 pages.

Kempe, et al.; "Protocols and Impossibility Results for Gossip-Based Communication Mechanisms;" Foundations of Computer Science, Jan. 2002; Proceedings. The 43rd Annual IEEE Symposium; pp. 471-480.

Key, et al.; "Combining Multipath Routing and Congestion Control for Robustness;" In Proceedings of IEEE CISS, 2006, 6 pages.

Kim, et al.; "Modeling Network Coded TCP Throughout: A Simple Model and its Validation;" VALUETOOLS '11 Proceedings of the 5th International ICST Conference on Performance Evaluation Methodologies and Tools; May 16-20, 2011; 10 pages.

Kim, et al.; "Modeling Network Coded TCP Throughput: A Simple Model and its Validation", Cornell University Library, http://arxiv.org/abs/1008.0420, Aug. 2010, 3 pages.

Kim, et al.; "Network Coding for Multi-Resolution Multicast;" IEEE INFOCOM 2010; Mar. 2010; 9 pages.

Kim, et al.; "Transform-free analysis of the GI/G/1/K queue through the decomposed Little's formula;" Computers and Operations Research; vol. 30; No. 3; Mar. 2003; pp. 1-20.

Kim, et. al.; "Modeling Network Coded TCP Throughput: A Simple Model and its Validation", arXiv: 1008.0420v1 [cs.IT] Aug. 2, 2010; 9 pages.

Kim, et. al.; "Modeling Network Coded TCP Throughput: A Simple Model and its Validation", Nov. 2010, Presentation; 19 pages.

Kodialam, et al., "Online Multicast Routing With Bandwidth Guarantees: A New Approach Using Multicast Network Flow;" IEEE/ACM Transactions on Networking; vol. 11; No. 4; Aug. 2003; pp. 676-686;

Koetter, et al.; "An Algebraic Approach to Network Coding;" IEEE/ACM Transactions on Networking; vol. 11, No. 5; Oct. 2003; pp. 782-795.

Koetter, et al.; "Beyond Routing: An Algebraic Approach to Network Coding;" IEEE Infocom; 2002; 9 pages.

Koutsonikolas, et al.; "Efficient Online WiFi Delivery of Layered-Coding Media using Inter-layer Network Coding; "Distributed Computing Systems (ICDCS); 2011 31st International Conference on Jun. 2011; 11 pages.

Kritzner, et al.; "Priority Based Packet Scheduling with Tunable Reliability for Wireless Streaming;" Lecture Notes in Computer Science; 2004; pp. 707-717.

Kuhn, et al.; "Distributed Computation in Dynamic Networks;" Proc. of the 42rd Symposium on Theory of Computing (STOC); Jun. 5-8, 2010; 10 pages.

Lai; "Sequential Analysis: Some Classical Problems and New Challenges"; Statistica Sinica, vol. 11, No. 2; 2001; pp. 303-350.

Landau; "Application of the Volterra Series to the Analysis and Design of an Angle Track Loop;" IEEE Transactions on Aerospace and Electronic Systems; vol. AES-8, No. 3; May 1972; pp. 306-318.

Larsson, et al.; "Analysis of Network Coded HARQ for Multiple Unicast Flows;" Communication (ICC) 2010 IEEE International Conference on May 23-27, 2010 pp. 1-6.

Larsson, et al.; "Multi-User ARQ;" Vehicular Technology Conference; 2006; VTC (2006-Spring); IEEE 63rd; vol. 4; May 7-10, 2006; pp. 2052-2057.

Larsson; "Analysis of Multi-User ARQ with Multiple Unicast Flows Under Non-iid Reception Probabilities;" Wireless Communication and Networking Conference 2007; WCNC 2007; IEEE; Mar. 11-15, 2007; pp. 384-388.

Larsson; "Multicast Multiuser ARQ;" Wireless Communications and Networking Conference (WCNC) 2008; IEEE; Apr. 3, 2008; pp. 1985-1990.

Le, et al.; "How Many Packets Can We Encode?—An Analysis of Practical Wireless Network Coding;" INFOCOM 2008; The 27th Conference on Computer Communications, IEEE; 2008; pp. 1040-1048.

Lee, et al.; "Content Distribution in VANETs using Network Coding: The Effect of Disk I/O and Processing O/H;" Proc. IEEE SECON; Jan. 2008; pp. 117-125.

Lehman, et al; "Complexity Classification of Network Information Flow Problems;" SODA 04 Proceedings of the fifteenth annual ACM-SIAM symposium on Discrete algorithms; Jan. 2004; pp. 9-10.

Li, et al.; "N-in-1 Retransmission with Network Coding;" IEEE Transactions on Wireless Communications; vol. 9; No. 9; Sep. 2010; pp. 2689-2694.

Li, et al.; "Robust and Flexible Scalable Video Multicast with Network Coding over P2P Network;" 2nd International Congress on Image and Signal Processing, IEEE: Oct. 17, 2009; pp. 1-5.

Li,et al.; "Linear Network Coding;" IEEE Transactions on Information Theory; vol. 49; No. 2; Feb. 2003; pp. 371-381.

Lima, et al.; "An Information-Theoretic Cryptanalysis of Network Coding—is Protecting the Code Enough;" International Symposium on Information Theory and its Applications; Dec. 2008; 6 pages.

Lima, et al.; "Random Linear Network Coding: A free cipher?" IEEE International Symposium on Information Theory; Jun. 2007; pp. 1-5.

Lima, et al.; "Secure Network Coding for Multi-Resolution Wireless Video Streaming;" IEEE Journal on Selected Areas in Communications; vol. 28; No. 3; Apr. 2010; pp. 377-388.

Lima, et al.; "Towards Secure Multiresolution Network Coding;" IEEE Information Theory Workshop; Jun. 12, 2009; pp. 125-129.

Liu, et al.; "The Throughput Order of Ad Hoc Networks Employing Network Coding and Broadcasting;" Military Communications Conference; MILCOM 2006; Oct. 2006; pp. 1-7.

Liu, et al.; "Using Layered Video to Provide Incentives in P2P Live Streaming;" P2P-TV07: Proceedings of the 2007 Workshop on Peer-to-peer Streaming and IP-TV; Aug. 31, 2007 ACM; 6 pages.

Luby, et al.; "The Use of Forward Error Correction (FEC) in Reliable Multicast;" Internet Society Request for Comments; RFC 3453; Dec. 2002; 18 pages.

Lucani et al.; "On Coding for Delay New Approaches based on Network Coding in Network Coding in Networks with Large Latency;" Presentation in NetCod; Slide Presentation; Jun. 16, 2009; 17 pages.

Lucani et al; "Broadcasting in Time-Division Duplexing: A Random Linear Network Coding Approach;" presented Switzerland; Conference: NetCod 2009, Lausanne, Switzerland; Jun. 2009; 6 pages.

Lucani et al; "On Coding for Delay—New Approaches Based on Network Coding in Networks with Large Latency;" Conference: ITA Workshop, San Diego, USA; Feb. 2009; 10 pages.

Lucani et al; "On Coding for Delay New Approaches based on Network Coding in Networks with Large Latency;" Conference ITA Workshop, San Diego, USA; Slide Presentation; Feb. 13, 2009; 11 pages.

Lucani et al; "Random Linear Network Coding for Time Division Duplexing: Energy Analysis;" Conference: ICC 2009, Dresden, Germany; Jun. 2009; 5 pages.

Lucani et al; "Random Linear Network Coding for Time-Division Duplexing: when to stop talking and start listening;" Presentation in ICC; Slide Presentation; Jun. 16, 2009; 6 pages.

Lucani et al; "Random Linear Network Coding for Time-Division Duplexing: when to stop talking and start listening;" Presentation in INFOCOM; Slide Presentation; Apr. 23, 2009; 10 pages.

Lucani et al; "Random Linear Network Coding for Time-Division Duplexing: Queueing Analysis;" Conference ISIT 2009, Seoul, Korea; Jul. 2009; 5 pages.

(56) References Cited

OTHER PUBLICATIONS

Lucani et al; "Random Linear Network Coding for Time-Division Duplexing: Field Size Considerations;" Conference: GLOBECOM 2009, Hawaii, USA; Dec. 2009; 6 pages.

Lucani, et al.; "Network Coding for Data Dissemination: It is Not What You Know, but What Your Neighbors Don't Know;" Modeling and Optimization in Mobile, AdHoc, and Wireless Networks 2009; WiOPT 2009; 7th International Symposium on Jun. 23-27, 2009; pp. 1-8.

Lucani, et al.; "Network Coding Schemes for Underwater Networks;" WUWNet 07; Sep. 14, 2007; pp. 25-32.

Lucani, et al.; "Systematic Network Coding for Time-Division Duplexing;" Proceedings of the IEEE International Symposium on Information Theory (ISIT); ; Jun. 13-18, 2010; pp. 2403-2407.

Lun, et al.; "Further Results on Coding for Reliable Communication over Packet Networks;" Information Theory, ISIT 2005 Proceedings International Symposium on Sep. 4-9, 2005; 5 pages.

Lun, et al.; "On Coding for Reliable Communication Over Packet Networks;" Physical Communication; vol. 1; No. 1; Jan. 2008; pp. 10 pages.

Lun, et al.; "On Coding for Reliable Communication over Packet Networks;" LIDS Publication #2741; Jan. 2007; 33 pages.

Lun, et al.; An Analysis of Finite-Memory Random Linear Coding on Packet Streams; Modeling and Optimization in Mobile, Ad Hoc and Wireless Networks; Apr. 3-6, 2006; pp. 1-6.

Lun; "Efficient Operation of Coded Packet Networks;" Ph.D. Dissertation; Massachusetts Institute of Technology; Jun. 2006; 130 pages.

Magli, et al.; "An Overview of Network Coding for Multimedia Streaming;" IEEE International Conference; Jun. 28, 2009; pp. 1488-1491.

Mallat, et al.; "Adaptive Covariance Estimation of Locally Stationary Processes;" Annals of Statistics, vol. 26, No. 1; 1998; pp. 1-43.

Manssour, et al.; "A Unicast Retransmission Scheme based on Network Coding;" IEEE Transactions on Vehicular Technology; vol. 61; Issue 2; Nov. 2011; 7 pages.

Maymounkov, et al.; "Methods for Efficient Network Coding;" Proc. of the 44th Allerton Conference on Communication, Control, and Computing; Sep. 2006; 10 pages.

Médard, et al.; "On Coding for Non-Multicast Networks;" invited paper, 41st Allerton Annual Conference on Communication, Control; Outgrowth of supervised student research Publications of Muriel Médard and Computing; vol. 1; Oct. 2003; 9 pages.

Medard; "Some New Directions for Network Coding in Content Distribution", RLE, EECS, MIT, Seminar to Alcatel Lucent, Nov. 2010, 29 pages.

Merchant, et al.; "Analytic Modeling of Clustered RAID with Mapping Based on Nearly Random Permutation;" IEEE Transactions on Computers; vol. 45; No. 3; Mar. 1996; pp. 367-373.

Metzner; "An Improved Broadcast Retransmission Protocol;" IEEE Transactions on Communications; vol. COM-32; No. 6; Jun. 1984; pp. 679-683.

Mosk-Aoyama, et al.; "Information Dissemination via Network Coding;" ISIT 2006; IEEE; Jul. 9-14, 2006; pp. 1748-1752.

Moyer, et al.; "A Survey of Security Issues in Multicast Communications;" IEEE Network; vol. 13; No. 6; Nov./Dec. 1999; pp. 12-23.

Nguyen, et al.; "Internet Media Streaming Using Network Coding and Path Diversity;" IEEE Global Telecommunications Conference; Nov. 30—Dec. 4, 2008; 5 pages.

Nguyen, et al.; "Wireless Broadcast Using Network Coding;" Vehicular Technology IEEE Transactions on Feb. 2009; vol. 58; Issue 2; 25 pages.

Nguyen, et al; "Video Streaming with Network Coding;" Journal of Signal Processing Systems; vol. 59; Issue 3; DOI: 10.1007/s11265-009-0342-7; Jun. 2010; 25 pages.

Nobel; "Hypothesis Testing for Families of Ergodic Processes;" Bernoulli-London, vol. 12, No. 2; 2006; 21 pages.

Noguichi, et al.; "Performance Evaluation of New Multicast Architecture with Network Coding;" IEICE Transactions on Communication, E86-B; No. 6; Jun. 2003; 3 pages.

NS Version 1—LBNL Network Simulator; web page—http://ee.lel.gov/ns/; Mar. 21, 2011; 3 pages.

Nyandoro, et al.; "Service Differentiation in Wireless LANs based on Capture;" IEEE GLOBECOM 2005; vol. 6; Dec. 2005; 5 pages.

Oliveira, et al.; "A Network Coding Approach to Secret Key Distribution;" IEEE Transactions on Information Forensics and Security; vol. 3; No. 3; pp. 414-423; Sep. 2008.

Parandehgheibi, et al.; "Access-Network Association Policies for Media Streaming in Heterogeneous Environments;" Apr. 2010; pp. 1-8.

Peng, et al.; "Research on Network Coding based Hybrid-ARQ Scheme for Wireless Networks;" Communication Systems (ICCS); 2010 IEEE International Conference on Nov. 17-19, 2010; pp. 218-222.

Popovici, et al.; "Robust, Portable I/O Scheduling with the Disk Mimic;" Proc. USENIX Annual Tech. Conf. San Antonio, Texas, Jun. 2003; 14 pages.

Qureshi, et al.; "An Efficient Network Coding based Retransmission Algorithm for Wireless Multicast;" Personal, Indoor and Mobile Radio Communications, 2009 IEEE 20th International Symposium on Sep. 13-16, 2009; 5 pages.

Radunovic, et al.; "Horizon: Balancing TCP Over Multiple Paths in Wireless Mesh Network;" Proc. 14th ACM International Conference on Mobile Computing and Networking; Sep. 2008; 12 pages.

Ramanathan; "Multicast Tree Generation in Networks with Asymmetric Links;" IEEE Transactions on Networking; vol. 4; Aug. 1996; pp. 1-12.

Rezaee, et al.; "Multi Packet Reception and Network Coding;" Presentation at the 2010 Military Communications Conference Unclassified Technical Program; Nov. 2, 2010; 15 pages.

Rezaee, et al.; "An Analysis of Speeding Multicast by Acknowledgment Reduction Technique (SMART) with Homogeneous and Heterogeneous Links—A Method of Types Approach;" Signals, Systems and Computers (ASILOMAR) 2011 Conference; IEEE; Nov. 2011; pp. 21-27.

Rezaee, et al.; "Speeding Multicast by Acknowledgment Reduction Technique (SMART);" ArXiv:1104.2941v2 [cs.NI] Sep. 10, 2011; 6 pages.

Rezaee, et al.; "Speeding Multicast by Acknowledgment Reduction Technique (SMART) Enabling Robustness of QoE to the Number of Users;" IEEE Journal on Selected Areas in Communication; vol. 30, No. 7; Aug. 2012; pp. 1270-1280.

Rezaee, et.al.; "Multi Packet Reception and Network Coding;" Military Communications Conference; 2010; MILCOM 2010; IEEE; Oct. 31, 2010-Nov. 3, 2010; pp. 1393-1398.

Rezaee; "Network Coding, Multi-Packet Reception, and Feedback: Design Tools for Wireless Broadcast Networks;" Submitted to Department of Electrical Engineering and Computer Science at Massachusetts Institute of Technology; Sep. 2011; 92 pages.

Riemensberger, et al.; "Optimal Slotted Random Access in Coded Wireless Packet Networks;" WiOPt 10: Modeling and Optimization in Mobile, Ad Hoc, and Wireless Networks; Jul. 13, 2010; pp. 374-379.

Roughgarden, et al.; "How Bad is Selfish Routing?" Journal of the ACM; vol. 49, No. 2; Mar. 2002; pp. 236-259.

Ruemmler, et al.; "An introduction to disk drive modeling;" IEEE Computers; vol. 27; No. 3; Mar. 17-29, 1994; 17 pages.

Ryabko, et al.; "On Hypotheses Testing for Ergodic Processes;" Information Theory Workshop; ITW'08; IEEE; 2008; pp. 281-283.

Sanders, et al.; "Polynomial Time Algorithms for Network Information Flow;" 15th ACM Symposium on Parallel Algorithms and Architectures; Jun. 2003; pp. 1-9.

Sayenko, et al.; "Performance Analysis of the IEEE 802.16 ARQ Mechanism;" MSWiM'07; Oct. 22-26, 2007; pp. 314-322.

Scharf; "MPTCP Application Interface Considerations draft-scharf-mptcp-ap-04;" Internet Engineering Task Force; Internet-Draft; Nov. 22, 2010; 26 pages.

Seferoglu, et al.; "Opportunistic Network Coding for Video Streaming over Wireless;" Packet Video; Nov. 2007; 10 pages.

(56) References Cited

OTHER PUBLICATIONS

Sengupta, et al.; "An Analysis of Wireless Network Coding for Unicast Sessions: The Case for Coding-Aware Routing;" in INFOCOM 2007; 26th IEEE International Conference on Computer Communications; Jun. 2007; 9 pages.
Servetto, et al.; "Constrained Random Walks on Random Graphs: Routing Algorithms for Large Scale Wireless Sensor Networks;" WSNA 02; Sep. 28, 2002; 10 pages.
Shenker, et al.; "Pricing in computer networks: reshaping the research agenda;" Telecommunications Policy; vol. 20, No. 3; Jan. 1996; pp. 183-201.
Sherali, et al.; "Recovery of primal solutions when using subgradient optimization methods to solve Lagrangian duals of linear programs;" Elsevier Operations Research Letters 19 (Jan. 1996); pp. 105-113.
Shields; "The Interactions Between Ergodic Theory and Information Theory;" IEEE Transactions on Information Theory, vol. 44, No. 6; Oct. 1998; pp. 2079-2093.
Shrader, et al.; "Systematic wireless network coding;" Military Conference, 2009; MILCOM 2009; IEEE; 7 pages.
Shrader, et al; "Routing and Rate Control for Coded Cooperation in a Satellite-Terrestrial Network;" IEEE: The 2011 Military Communications Conference—Track 2—Network Protocols and Performance; Nov. 7-10, 2011; pp. 735-740.
Shriver, et al.; "An analytic behavior model for disk drives with readahead caches and request reordering;" Proc. SIGMETRICS/Performance, Joint Conf. on Meas. and Modeling Comp. Sys.; ACM; Jan. 1998; 10 pages.
Song, et al.; "Zero-Error Network Coding for Acyclic Networks;" IEEE Transactions on Information Theory; vol. 49, No. 12; Dec. 2003; pp. 3129-3139.
SongPu, et al.; Performance analysis of joint chase combining and network coding in wireless broadcast retransmission; Wireless Communication, Network and Mobile Computing 2008; WiCOM '08, 4th International Conference on Oct. 12-14, 2008; pp. 1-4.
Soo Suh; "Send-On-Delta Sensor Data Transmission With a Linear Predictor;" Sensors; ISSN 1424-8220; vol. 7; No. 4; Apr. 26, 2007; pp. 537-547.
Sun, et al.; "Cooperative Hybrid-ARQ Protocol with Network Coding;" Communications and Networking in China 2009—ChinaCOM 2009; Fourth International Conference on Aug. 26-28, 2009; pp. 1-5.
Sundaram, et al.; "Multirate Media Streaming Using Network Coding;" Proc. 43rd Allerton Conference on Communication, Control, and Computing; Sep. 2005; 7 pages.
Sundararajan, et al.; "ARQ for Network Coding;" ISIT Proc. of the IEEE International Symposium on Information Theory (ISIT); Jul. 6-11, 2008; pp. 1651-1655.
Sundararajan, et al.; "Network Coding Meets TCP: Theory and Implementation;" Proceedings of the IEEE; vol. 99, Issue 3; Mar. 2011; pp. 490-512.
Sundararajan, et al.; "Network coding meets TCP;" InfoCOM 2009; IEEE, Apr. 19-25, 2009; pp. 280-288.
Sundararajan, et al.; On Queueing in Coded Networks—Queue Size Follows Degrees of Freedom; IEEE Information Theory Workshop on Information Theory for Wireless Networks (ITW); Jul. 1-6, 2007; 6 pages.
Teerapittayanon, et al.; "Network Coding as a WiMAX Link Reliability Mechanism;" Multiple Access Communication; Lectures Notes in Computer Science; vol. 7642; pp. 1-12; 2012.
Teerapittayanon, et al.; "Performance Enhancements in Next Generation Wireless Networks Using Network Coding: A Case Study in WiMAX;" Massachusetts Institute of Technology; Jun. 2012; 130 pages.
Thobaben; "Joint Network/Channel Coding for Multi-User Hybrid-ARQ;" Source and Channel Coding (SCC) 2008; 7th International ITG Conference on Jan. 14-16, 2008; 6 pages.
Tosun, et al.; "Efficient Multi-Layer Coding and Encryption of MPEG Video Streams;" Proc. 2000 IEEE International Conference on Multimedia and Expo; vol. 1; 2000; pp. 119-122.
Tosun, et al.; "Lightweight Security Mechanisms for Wireless Video Transmission;" Proc. Intl. Conference on Information Technology, Coding and Computing; Apr. 2001; pp. 157-161.
Tran, et al.; "A Hybrid Network Coding Technique for Single-Hop Wireless Networks;" IEEE Journal on Selected Areas in Communications; vol. 27; No. 5; Jun. 2009; pp. 685-698.
Tran, et al.; "A Joint Network-Channel Coding Technique for Single-Hop Wireless Networks;" Network Coding, Theory and Applications; 2008; NetCod 2008; Fourth Workshop on Jan. 3-4, 2008; pp. 1-6.
Trung, et al.; "Quality Enhancement for Motion JPEG Using Temporal Redundancies;" IEEE Transactions on Circuits and System for Video Technology, vol. 18; No. 5; May 2008; pp. 609-619.
Tsatsanis, et al.; "Network Assisted Diversity for Random Access Wireless Data Networks;" Signals, Systems & amp; Computers; IEEE; vol. 1; Nov. 1-4, 1988; pp. 83-87.
Valancius, et al.; "Greening the Internet with Nano Data Centers;" Proc. 5th International Conference on Emerging Networking Experiments and Technologies; CoNEXT 2009; ACM 2009; Dec. 1-4, 2009; pp. 37-48.
Vasudevan, et al.; "Algebraic Gossip on Arbitrary Networks;" arXiv:0901.1444; Jan. 2009; 5 pages.
Velambi, et al.; "Throughput and Latency in Finite-Buffer Line Networks;" IEEE Transactions on Information Theory; vol. 57; No. 6; Jun. 2011; pp. 3622-3643.
Vien, al.; "Network Coding-based Block ACK for Wireless Relay Networks;" Proceedings of IEEE Vehicular Technology Conference (VTC2011-Spring); May 2011; 5 pages.
Vien, et al.; "Network Coding-based ARQ Retransmission Strategies for Two-Way Wireless Relay Networks;" Software, Telecommunications and Computer Networks (SoftCOM) 2010; International Conference on Sep. 23-25, 2010; 5 pages.
Vilela, et al.; "Lightweight Security for Network Coding;" IEEE International Conference on Communications; May 2008; 5 pages.
Wang, et al.; "Capacity-Delay Tradeoff for Information Dissemination Modalities in Wireless Networks;" in Information Theory; ISIT 2008; IEEE International Symposium; Jul. 2008; pp. 677-681.
Wang, et al.; "Embracing Interference in Ad Hoc Networks Using Joint Routing and Scheduling with Multiple Packet Reception;" in INFOCOM 2008; The 27th Conference on Computer Communications; IEEE; Apr. 2008; pp. 1517-1525.
Wang, et al.; Multipath Live Streaming via TCP: Scheme, Performance and Benefits; ACM Transactions on Multimedia Computing, Communications and Applications; vol. 5; No. 3; Article 25; Aug. 2009; pp. 1-23.
Widmer, et al.; "Network Coding for Efficient Communication in Extreme Networks;" Applications, Technologies, Architectures, and Protocols for Computer Communication; Aug. 2005; pp. 284-291.
Wieselthier, et al.; "Energy Efficient Broadcast and Multicast Trees in Wireless Networks;" Mobile Networks and Applications 7; Jan. 2002; pp. 481-492.
Wieselthier, et al.; "Energy-Aware Wireless Networking with Directional Antennas: The Case of Session-Based Broadcasting and Multicasting;" IEEE Transactions on Mobile Computing; vol. 1, No. 3; Jul.-Sep. 2002; pp. 176-191.
Wilhelm; "An Anomaly in Disk Scheduling: A Comparison of FCFS and SSTF Seek Scheduling Using an Empirical Model for Disk Access;" Communications of the ACM, vol. 19; No. 1; Jan. 1976; pp. 13-17.
Wu, et al.; "A Trellis Connectivity Analysis of Random Linear Network Coding with Buffering;" Proc. of the International Symposium on Information Theory (ISIT); Jul. 9-14, 2006; pp. 768-772.
Yazdi, et al.; "Optimum Network Coding for Delay Sensitive Applications in WiMAX Unicast;" IEEE INFOCOM 2009; Apr. 19-25, 2009; pp. 1576-2580.
Yeung; "Multilevel Diversity Coding with Distortion;" IEEE Transactions on Information Theory; vol. 41, No. 2; Mar. 1995; pp. 412-422.
Yong, et al.; "XOR Retransmission in Multicast Error Recovery;" Networks 2000; ICON; Proceedings IEEE International Conference on Sep. 5-8, 2000; pp. 336-340.

(56) References Cited

OTHER PUBLICATIONS

Yun, et al.; "High-Throughput Random Access Using Successive Interference Cancellation in a Tree Algorithm;" IEEE Transactions on Information Theory; vol. 53, No. 12; Dec. 2007; pp. 4628-4639.
Yun, et al.; Towards Zero Retransmission Overhead: A Symbol Level Network Coding Approach to Retransmission; IEEE Transactions on Mobile Computing; vol. 10; No. 8; Aug. 2011; pp. 1083-1095.
Zeger; "Packet Erasure Coding with Random Access to Reduce Losses of Delay Sensitive Multislot Messages;" IEEE; Paper ID #900482; Aug. 18, 2009; pp. 1-8.
Zhang, et al.; "Collision Resolution in Packet Radio Networks Using Rotational Invariance Techniques;" IEEE Transactions on Communication; vol. 50; No. 1; Jan. 2002; pp. 146-155.
Zhang, et al.; "Optimized Multipath Network Coding in Loss Wireless Networks;" ICDCS '08 Proceedings of the 2008 The 28th International Conference on Distributing Computing Systems; Jan. 2008; 12 pages.
Zhang, et al.; Dual XOR in the Air: A Network Coding Based Retransmission Scheme for Wireless Broadcasting; Communications (ICC) 2011 IEEE International Conference on Jun. 5-9, 2011; pp. 1-6.
Zhao, et al.; "A Multiqueue Service Room MAC Protocol for Wireless Networks With Multipacket Reception;" IEEE/ACM Transactions on Networking; vol. 11; No. 1; Feb. 2003; pp. 125-137.
Zhao, et al.; "On analyzing and improving COPE performance;" Information Theory and Applications Workshop (ITA), Jan. 2010; pp. 1-6.
Zhu, et al.; "Multicast with Network Coding in Application-Layer Overlay Networks;" IEEE Journal on Selected Areas in Communications; vol. 22; No. 1; Jan. 2004; pp. 1-13.
Office Action dated Nov. 17, 2021 for Application No. 201880022129.9; 4 Pages.
Intention to Grant dated Feb. 16, 2022, for Application No. 18 720 064.7-1216; 11 Pages.
Response to Office Action filed Mar. 29, 2022, for Application No. 201880022129.9; 16 Pages.

* cited by examiner

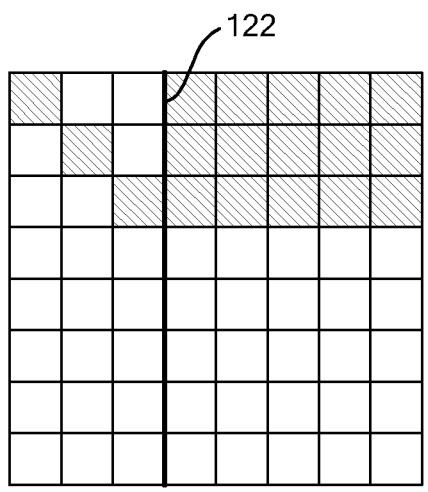 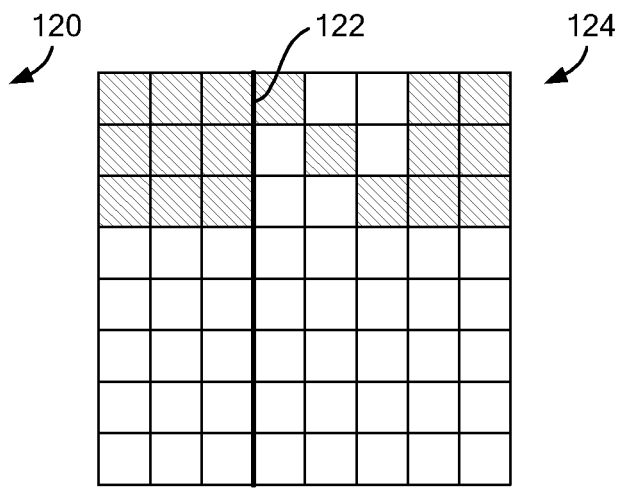
*FIG. 7*  *FIG. 7A*

SYSTEM AND TECHNIQUE FOR SLIDING WINDOW NETWORK CODING-BASED PACKET GENERATION

CROSS REFERENCE TO RELATED APPLICATIONS

This patent application is a U.S. National Stage of PCT Application No. PCT/US2018/025168 filed in the English language on Mar. 29, 2018, and entitled "SYSTEM AND TECHNIQUE FOR SLIDING WINDOW NETWORK CODING-BASED PACKET GENERATION," which claims priority to and benefit of U.S. Provisional Patent Application No. 62/478,114 filed on Mar. 29, 2017, which are incorporated here by reference in their entireties.

BACKGROUND

Sliding window network coding encoders are known in the art. Sliding window refers to a technique in which linear coding is applied to a window of packets to generate a coded packet. In general, a window size utilized in such encoder dynamically varies between 1 and a maximum window size of N where N can, theoretically, be infinitely large. Those of ordinary skill in the art will appreciate how to select the value of N in practical systems.

In general, a sliding window encoder may operate in the following manner: first, the sliding window encoder is fed with new data. In response to the data provided thereto, the encoder increases the window size of the sliding window encoder. A sender sends a packet to a receiver and upon reception of the packet the receiver sends an ACK packet back to the sender. The sliding window encoder receives the ACK packet and in response thereto may reduce the size of the sliding window (hence the reason the technique is referred to as a sliding window technique—i.e. new packets are added to the encoder and old ones are removed). A sliding window may be applied over a generation (i.e. over a group of packets) or can be generation-less.

As is also known, some sliding window coders apply random linear network coding (RLNC) as a convolutional code. A general study of such a sliding window code and its properties was provided by M. Karzand, D. J. Leith, J. Cloud, and M. Medard, "Low Delay Random Linear Coding Over A Stream," arXiv preprint arXiv:1509.00167, 2015. One possible implementation for SATCOM was studied in J. Cloud and M. Medard, "Network coding over satcom: Lessons learned," in International Conference on Wireless and Satellite Systems. Springer, 2015, pp. 272-285 and for multiple combined paths in J. Cloud and M. Medard, "Multipath low delay network codes," arXiv preprint arXiv: 1609.00424, 2016. These sliding window approaches show superior delay properties for streaming applications as compared to generation-based codes. However, such prior art approaches generally assume an infinite sliding window, or a sliding window of dynamic size, which is closed only by feedback.

Some prior art techniques (e.g. see V. Roca, B. Teibi, C. Burdinat, T. Tran, and C. Thienot, "Block or Convolutional AL-FEC codes? a performance comparison for robust low-latency communications," 2016) suggest the use of convolutional codes over block codes for delay sensitive applications, based upon a comparison of Reed-Solomon and a finite sliding window random linear code (RLC). However, such techniques don't describe how such a coding process can be implemented efficiently, and don't consider feedback.

TCP/NC is described in J. K. Sundararajan, D. Shah, M. Medard, M. Mitzenmacher, and J. Barros, "Network coding meets TCP," in INFOCOM 2009, IEEE. IEEE, 2009, pp. 280-288. This technique adds an intermediate layer of network coding between TCP and IP, including feedback in the process and uses a general form of sliding window where packets are combined in an unrestricted manner and coding is not limited by structures such as blocks and generations. In such forms of sliding window, the coding window (the packets currently being buffered for potential coding at the encoder) is only closed by acknowledgement signals (ACKs), and can possibly be very large—at least in the range of the bandwidth delay product, as coding is always performed over the whole congestion window (i.e., the packets currently being buffered for potential retransmission at the sender).

Another technique described in Karafillis et. al. improves on the above TCP/NC technique by sending additional redundant packets—see P. Karafillis, K. Fouli, A. ParandehGheibi, and M. Medard, "An algorithm for improving sliding window network coding in TCP," in Information Sciences and Systems (CISS), 2013 47th Annual Conference on. IEEE, 2013, pp. 1-5. With the feedback, the receiver signals the number of lost degrees of freedom. The sender uses this information to send additional packets at specific intervals, e.g. every 13 packets.

Kim et. al. describes Coded TCP ("CTCP") see M. Kim, J. Cloud, A. ParandehGheibi, L. Urbina, K. Fouli, D. Leith, and M. Medard, "Network Coded TCP (CTCP)," arXiv preprint arXiv:62.2291, 2012. The CTCP technique is an integration of network coding inside of TCP. This approach utilizes sequence numbers for packets and a systematic code. Feedback is sent only at the end of each block. The block size may be set at the bandwidth delay product, which can result in very large generations.

Block codes have low complexity but introduce delays, as the decoder needs to wait for a sufficient number of packets to arrive to decode each block. Conventional sliding window techniques, on the other hand, offer low latency since they can receive packets and decode simultaneously. This comes at the price of potentially high complexity from overhead, feedback, and decoding operations that involve potentially many packets. This invention combines the merits of both block (low complexity) and sliding window methods (low latency). This is done by strictly limiting the number of packets in the sliding window, by using systematic coding, and by adapting the sliding window coding architecture (e.g., packet format, coefficient matrix) to reduce the number of linear operations required in coding operations (i.e., lower complexity). The result is a sliding window code (low latency compared to block codes), but with a static window size which allows implementation using existing block encoders/decoders tools. This leads to similar packet loss properties and very high performance of the encoders and decoders, as existing block encoders/decoders have been optimized for performance on various CPU architectures already. Another advantage of the limited sliding window is to reduce buffering needs at all coding nodes.

SUMMARY

In contrast to prior art techniques, described herein is a finite sliding window approach of fixed size that can be efficiently implemented. The systems and techniques described herein combine the low latency of sliding window codes with the efficiency and reliability characteristics of generation-based codes. Sliding windows reduce packet latency compared to block codes but are potentially more complex (see comment above). The latency gains come from the fact that sliding window decoders can decode while receiving coded data, while block decoders cannot perform those operations simultaneously. This technique allows the use of a sliding window while controlling complexity. This technique also keeps the tunability and flexibility advantages of conventional linear coding-based sliding window methods, whereby parameters such as the encoding/decoding window sizes or the code rate can be modified dynamically. This allows multiple trade-offs (e.g., delay vs. reliability/throughput/complexity).

Also, in contrast to prior art techniques, the systems and techniques described herein utilize a systematic code within the finite window design. Systematic codes send data uncoded first, reducing decoding and recoding complexity than non-systematic coding systems.

Also, in contrast to prior art techniques, the systems and techniques described herein may utilize a forward erasure code window (i.e. a "FEC window"). The FEC window further restricts the number of symbols that can be coded and recoded. This reduces the number of linear operations required to recode or decode symbols, thus further reduces the computational complexity of the operations and allowing for easier recoding. The use of a FEC window that is smaller than the coding window allows for the use of feedback schemes to re-include lost packets from the coding window into the output coded packets.

Performance characteristics of the described systems and techniques may be improved relative to prior art techniques. For example, the described systems and techniques may be improved relative to prior art techniques in terms of delay, since in accordance with the concepts described herein, redundant packets may be sent often rather than only at the end of (possibly large) generations as is done in in prior art techniques.

Further, the described systems and techniques could replace the block coded approach in coded TCP ("CTCP") and thus be incorporated into CTCP. While providing absolute delivery reliability may be costly, unlike traditional sliding window coding approaches (e.g., in CTCP) the disclosed concepts may be used to provide low latency and low complexity.

It should also be appreciated that the approach described herein could also be implemented on a Link Layer, assuming another protocol like TCP which provides reliability on top. In such a case, the technique described herein would help in reducing the losses witnessed by TCP, and improve delay compared to other automatic repeat request (ARQ) schemes.

With this arrangement, a generation-less sliding window code is provided. Various embodiments provide, among other advantages: a modular design allowing easy integration with commercial software libraries and applications while keeping the high performance of commercial software library bloc codes; coping with various network requirements; simplifying or eliminating the handling of multiple packet generations; providing low delay and high reliability for upper protocol layers; and providing tradeoffs between delay, efficiency, and reliability.

Therefore, a first embodiment of the concepts, systems, and techniques described herein provides a method of decoding packetized data in the presence of packet erasures comprising a decoder repeatedly performing several processes. A first process includes receiving a coded packet comprising a packet sequence number, a coefficient vector having a fixed length w, and a coded symbol encoded as a linear combination of w input symbols using the coefficient vector. A second process includes determining whether the packet sequence number is within a sliding window of w consecutive sequence numbers that are no greater than a decoder sequence number. And a third process includes, when the packet sequence number is within the sliding window, decoding the coded symbol into one or more of the w input symbols using the coefficient vector.

The method may include the following variations in any combination. The fixed size of the sliding window may be predetermined according to a round-trip time for data traveling between the decoder and an encoder via a data channel. The coded packet may have a packet sequence number that is out of order. Receiving may include receiving a plurality of packets including the coded packet and decoding may include correcting an error in one of the plurality of packets according to a forward error correcting code. Moreover, decoding may include using a systematic code or a linear network code. Decoding may include setting the decoder sequence number equal to the packet sequence number of the received packet when the packet sequence number of the received packet is greater than the decoder sequence number. Decoding using the coefficient vector may include generating a packet erasure when the coefficient vector has a non-zero entry associated with an input symbol whose sequence number is outside the sliding window. Decoding also may include performing Gaussian elimination on a matrix, one row of which includes the coefficient vector. In this embodiment, prior to performing the Gaussian elimination, decoding may include deleting each row of the matrix that has a non-zero coefficient entry associated with an input symbol whose sequence number is outside the sliding window. Alternately or also in this embodiment, performing the Gaussian elimination comprises pivoting on the column of the matrix whose index equals the decoder sequence number modulo the size of the sliding window.

The decoder may further provide feedback to an encoder via a data channel, thereby enabling the encoder to transmit, via the data channel, one or more packets reencoding any data that the decoder did not decode due to a packet erasure.

Another embodiment of the concepts, systems, and techniques described herein is a tangible, computer-readable storage medium, in which is non-transitorily stored computer program code that, when executed by a computer processor, performs the above-described method or any of its variants or embellishments.

Yet another embodiment of the concepts, systems, and techniques described herein is a decoder for decoding packetized data in the presence of packet erasures. The decoder includes a buffer for receiving a coded symbol from a coded packet comprising a packet sequence number, a coefficient vector having a fixed length w, and the coded symbol encoded as a linear combination of w input symbols using the coefficient vector. The decoder also includes a register for storing a decoder sequence number. The decoder further includes a determining unit for determining whether the packet sequence number is within a sliding window of w consecutive sequence numbers that are no greater than the decoder sequence number stored in the register. The decoder also includes a decoding module for decoding, when the determining unit determines that the packet sequence number is within the sliding window, the received coded symbol into one or more of the w input symbols using the coefficient vector.

The decoder embodiment may be varied in like manner to the method described above. Thus, the buffer may receive a plurality of symbols including the coded symbol, from a corresponding plurality of packets including the coded packet, and the decoding module may correct an error in one of the plurality of packets according to a forward error correcting code. The decoding module may decode according to a systematic code or a linear network code. The decoding module may write the packet sequence number of the received packet into the register when the packet sequence number of the received packet is greater than the decoder sequence number stored in the register. The decoding module may generate a packet erasure when the coefficient vector has a non-zero entry associated with an input symbol whose sequence number is outside the sliding window.

The decoder may further comprise a memory for storing a matrix, wherein the decoding module may store the coefficient vector in one row of the matrix and perform Gaussian elimination on the matrix. In this embodiment, the decoding module may delete from the memory, prior to performing the Gaussian elimination, each row of the matrix that has a non-zero coefficient entry associated with an input symbol whose sequence number is outside the sliding window. Alternately or in addition, the decoding module may perform the Gaussian elimination by pivoting on the column of the matrix whose index equals the decoder sequence number modulo the size of the sliding window.

The decoder may further comprise a feedback module capable of providing feedback to an encoder via a data channel, thereby enabling the encoder to transmit, via the data channel, one or more packets reencoding any data that the decoder did not decode due to a packet erasure. The decoding module may include an application-specific integrated circuit (ASIC) or a field-programmable gate array (FPGA).

Still another embodiment of the concepts, systems, and techniques described herein is a different decoder for decoding packetized data in the presence of packet erasures. This decoder comprises receiving a coded symbol from a coded packet comprising a packet sequence number, a coefficient vector having a fixed length w, and the coded symbol encoded as a linear combination of w input symbols using the coefficient vector. This decoder also includes storing means for storing a decoder sequence number. The decoder further includes determining means for determining whether the packet sequence number is within a sliding window of w consecutive sequence numbers that are no greater than the decoder sequence number stored in the register. Also, the decoder includes decoding means for decoding, when the determining unit determines that the packet sequence number is within the sliding window, the received coded symbol into one or more of the w input symbols using the coefficient vector.

Persons having ordinary skill in the art may recognize other ways to embody the concepts, systems, and techniques described herein.

BRIEF DESCRIPTION OF THE DRAWINGS

The manner and process of making and using the disclosed embodiments may be appreciated by reference to the drawings, in which:

FIGS. 7 and 7A are diagrams illustrating different Gaussian elimination strategies;

FIGS. 14, 14A, 14B, and 14C are a series of diagrams illustrating a coefficient matrix for different retransmission schemes.

DETAILED DESCRIPTION

The concepts, systems, and techniques described herein may be used to perform erasure coding between coders using a finite sliding window. Before describing these concepts, systems, and techniques in detail, introductory concepts and terminology as used herein are explained.

A "symbol" is a vector of elements in the finite field GF(q). In general q is a prime power; for binary data communication, q is a power of 2.

A "sequence number" is a number that uniquely identifies a source symbol in a sequence of source symbols.

A "sliding window" is a sequence of consecutive symbols having a fixed window size. An "encoder sliding window" has fixed window size denoted $w_e$, while a "decoder sliding window" has fixed window size denoted $w_d$. The sizes of the sliding windows in the encoder $w_e$ and in the decoder $w_d$ may be different.

A "coded symbol" is a vector of elements in GF(q) that is a linear combination of at most $w_e$ input symbols, where each coefficient of the linear combination is an element in GF(q).

An "uncoded packet" is a unit of data to be exchanged between two coders that includes a sequence number and an uncoded symbol.

A "coded packet" is a unit of data to be exchanged between two coders that includes a sequence number, a coefficient vector of length $w_e$, and a coded symbol encoded as a linear combination using the coefficients included in the coefficient vector.

An "erasure" is a missing element of a sequence.

"Erasure coding" means coding one or more input symbols into a packet sequence that may include erasures.

Figure 1:
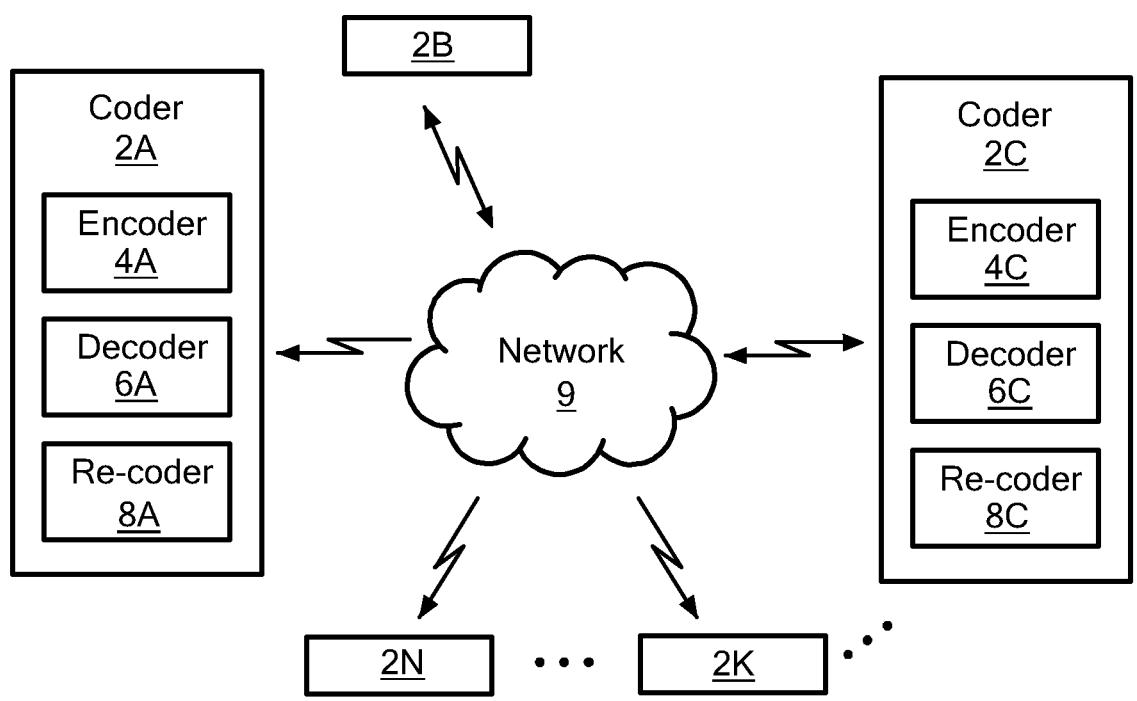
FIG. 1 is a diagram illustrating an exemplary system in which the principles herein may be embodied.

With reference to FIG. 1, a system includes several coders 2a to 2N connected by a network 9. The coders may be implemented as computers, or using special purpose hardware, firmware, software, or a combination of these. Thus, for example, coder 2a may be implemented as an application-specific integrated circuit (ASIC) or a field-programmable gate array (FPGA) or similar technology. Coders may be present at any node in the network and are not restricted to the edge of the network. Each coder 2a to 2N may be made from identical or different components, and any number of such coders may be present in a system in accordance with an embodiment of the concepts, systems, and techniques described herein.

The coders 2a to 2N communicate with each other using coded and uncoded packets. Manipulation of elements in GF(q) further to such communication may be performed using any hardware or software known in the art. For example, the Fifi library published by Steinwurf ApS of Denmark may be used for this purpose.

Each coder to 2A to 2N may be used for encoding packets, decoding packets, recoding packets, or any combination of these. The most general case is that a coder performs all three of these functions. The operation of exemplary coder 2A is therefore described below in detail. However, various embodiments may include a coder (for example coder 2C that only transmits packets, and thus requires only an encoder (e.g. encoder 4C, omitting decoder 6C and recoder 8C). Other embodiments may include a coder (for example coder 2C) that only receives packets, and thus requires only a decoder (e.g. decoder 6C, omitting encoder 4C and recoder 8C). Still other embodiments may include a coder (for example coder 2C) that only forwards packets, and thus requires only a recoder (e.g. recoder 8C, omitting encoder 4C and decoder 6C).

Figure 2:
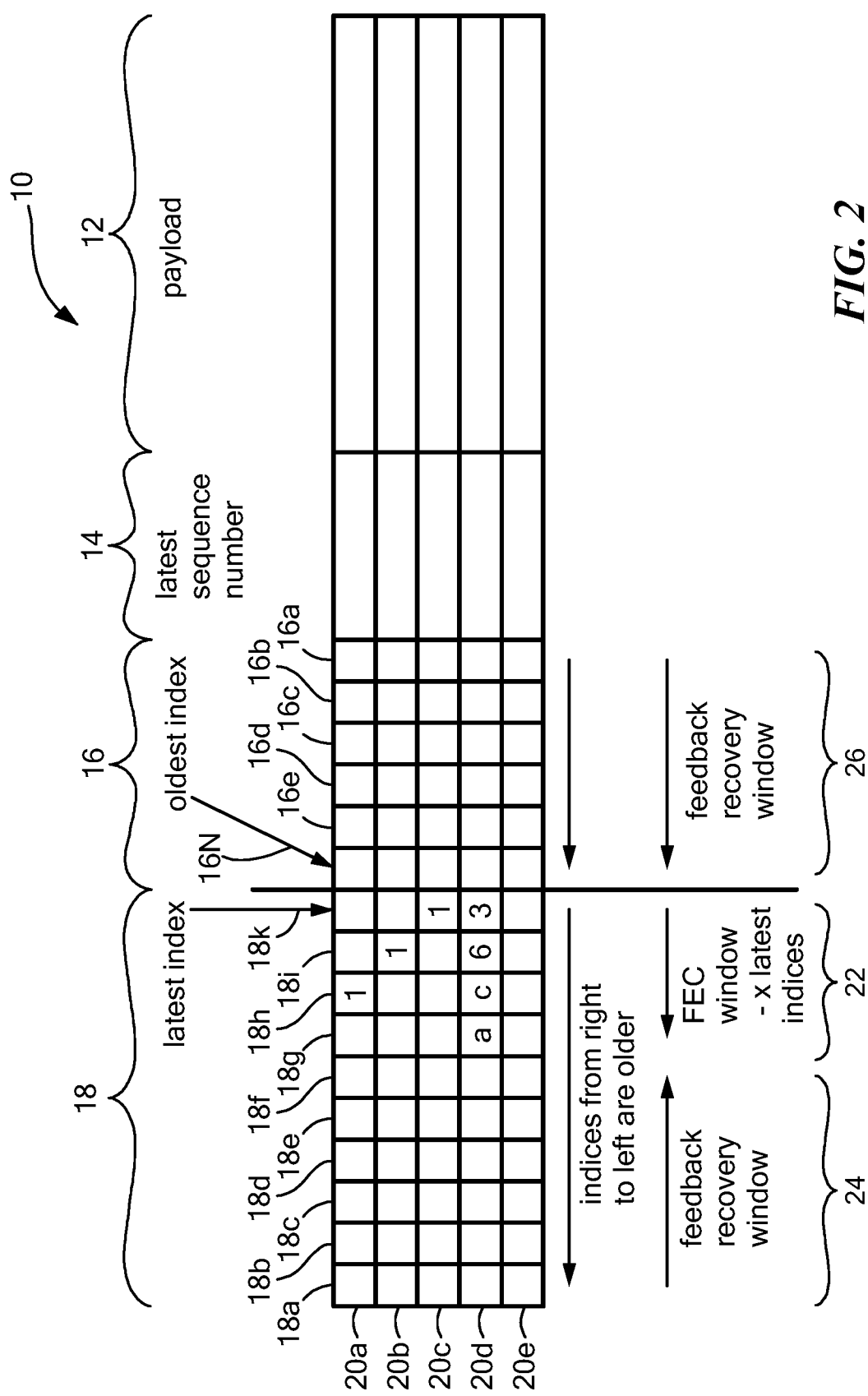
FIG. 2 is a diagram illustrating coded packets as they might be transmitted by an encoder.

Coder 2a has an encoder 4a, which takes as input a sequence of source symbols and generates as output a corresponding sequence of coded or uncoded packets. Thus, coder 2a is suitable to transmit information as a channel source. FIG. 2 is a diagram illustrating coded packets as they might be transmitted by encoder 4a. The operation of encoder 4a is illustrated in detail in FIG. 3. An embodiment of encoder 4a is illustrated in detail in FIG. 4.

Coder 2a also has a decoder 6a, which takes as input a sequence of coded or uncoded packets and generates as output a corresponding sequence of source symbols, optionally in order. Thus, coder 2a is suitable to receive information as a channel sink. The operation of decoder 6a is illustrated in detail in FIG. 5 with references to FIGS. 6 and 7. An embodiment of decoder 6a is illustrated in detail in FIG. 8.

Coder 2a also has a recoder 8a, which takes as input a sequence of coded or uncoded packets and generates as output a corresponding sequence of coded and uncoded packets, where the output coded packets may be recoded packets; that is, coded packets whose coding is different from input coded packets. Thus, coder 2a is suitable to forward information from a channel source to a channel sink using, for instance, a linear network code. The operation of recoder 8a is illustrated in detail in FIG. 9. An embodiment of recoder 8a is illustrated in detail in FIG. 10.

Referring now to FIG. 2, details of an embodiment are illustrated by reference to some coded packets 20a-20e as they could have been sent by an encoder (such as encoder 4a). Each coded packet includes a payload 12, such as a coded symbol, and a coding header 14, 16, 18. The coding header includes a packet sequence number ("PSN") 14. The PSN 14 represents the largest sequence number of an input symbol used in the encoding of the coded symbol as a linear combination of input symbols. Thus, according to one transmission sequence, the first PSN 14a may be 0, the second PSN 14b may be 1, and so on. However, in accordance with various embodiments, the decoder may receive the coded packets out of order, or the encoder may transmit coded packets that redundantly code input symbols using the same PSN (for example, over a data channel subject to many erasures).

In some embodiments, the coding header optionally includes a coefficient vector 16, 18. That is, in some embodiments, when an uncoded packet is transmitted the coefficient vector 16, 18 is omitted or replaced by other data to provide more efficient use of the data channel between the encoder and the decoder. Alternately, the coefficient vector 16, 18 may be transmitted but contains a single, non-zero entry equal to 1 in GF(q). Regardless, when the coefficient vector is transmitted it has a predetermined, fixed size equal to the window length $w_e$. The coefficient vector may be used to recover input symbols in the presence of packet erasures, as described below.

In accordance with embodiments, the indices of the coefficient vector are interpreted in a special way by the decoder. A decoder index is used to keep track of which sequence numbers are within the sliding window, and which are not. To assist in understanding this concept, FIG. 2 shows the decoder index and divides the coefficient vector into an older component 16 and a newer component 18. The decoder index moves from left to right through coefficient vector, so the coefficient index associated with the oldest (i.e. least) sequence number in the sliding window is 16N, and the coefficient indices 16a to 16e refer to newer sequence numbers from left to right. The next newest sequence number is associated with coefficient index 18a, and these become newer still from 18b-18k, the latter being the decoder index.

In various embodiments, the decoder index tracks the source symbol with the largest sequence number received by the decoder in a data packet. In this case, the decoder index may be computed as this largest sequence number modulo the fixed window size $w_e$ of the encoder. As noted above, the other indices represent older symbols. This means that an index is re-used every $w_e$ source symbols, and special care must be taken to handle the re-usage correctly.

The latest coefficient indices present in newer component 18 of the coefficient vector may be further divided to recognize a forward error correction ("FEC") window 22 having a width "f". The FEC window 22 comprises the latest transmitted symbol and f−1 symbols before that. These symbols are used for active forward coding, e.g. opportunistic coding even without feedback. If the FEC window 22 comprises 4 symbols, then the symbols associated to coefficients 18g-18k may be used to perform FEC. The feedback recovery window 24, 26 contains coefficients associated to older symbols, which should be only used when required, e.g. after the decoder detects that one or more of these symbols is missing or cannot be decoded.

Dividing recovery into an FEC window 22 and a feedback recovery window 24, 26 is advantageous. Doing so keeps the FEC window small enough to handle typical expected bursts of transmitted packets (e.g. 16 packets), while keeping the feedback recovery window 24, 26 large enough to be able to recover packets transmitted during at least one round-trip time ("RTT"), including all buffering (e.g. 128-256 packets). Thus, the encoder and decoder may negotiate the sliding window size $w_e$ by exchanging data to measure the RTT, thereby predetermining a fixed size for $w_e$ prior to the encoder transmitting the first coded packet. A decoding method using the FEC window 22 is described below and contrasted with the prior art in connection with FIGS. 11-14C.

A particularly useful application of these concepts occurs when the network 9 comprises a mesh network, or other network for which multiple paths or multiple channels exist between the coders 2a to 2N. The general concept is to use sliding window, with or without feedback, over multiple disjoint channels or paths, e.g. LTE+Wi-Fi. To apply multi-path, it is important to include provisions that consider different packet latencies, out-of-order delivery, sliding window size, and so on.

In multi-path operation, the encoder or any recoder can decide to send packets through more than one path to the destination decoder or to an intermediate node. The node initiating multipath operation, typically the source node containing the encoder, is henceforth termed the "multi-path node." The decision over which packets to transmit over which path can be based on information the multi-path node has received or inferred on the various paths. Some multi-path mechanisms include, but are not, limited to, the following.

Multi-path nodes may allocate packets to paths based on path loss or path load determination. Such a determination may be based on state information communicated by another node (e.g., destination, downstream nodes, network management) or inferred by the multi-path node itself from source-destination traffic (e.g., monitoring feedback and deducing lost packets on each path) or some other available metric (e.g., CSI).

The multi-path node may send systematic (i.e., source, uncoded) packets through the faster or more reliable path to decrease decoding complexity and speed up the connection, as this ensures that more source packets reach the decoder in a shorter time, requiring less linear operations for decoding and enabling faster delivery of source packets.

The multi-path node may use inferred (e.g., CSI) or received information about path latency (e.g. feedback) to refrain from using paths when their associated latency is deemed to cause packets to be useless upon receipt by the destination (i.e., fall outside the decoding window upon receipt).

Intermediate nodes on different paths may be selective in their transmissions of received packets, in their retransmissions of received packets, or in their transmission of coded/recoded packets. A packet sampling process (i.e., send one packet for every M received packets) can be applied, implementing a target sampling rate (i.e., 1/M here).

This packet sampling rate can be communicated by another node (e.g., source, destination, network management) or inferred by the multi-path node itself from its position in the transfer (e.g., closer nodes to the destination send at a lower rate), from source-destination traffic, from feedback from neighboring nodes, or from some other available metric.

FIGS. 3, 5, 5A, and 11 are flow diagrams illustrating processing that can be implemented within the system 2 (FIG. 1). Rectangular elements (typified by element 30 in FIG. 3), are sometimes denoted herein as "processing blocks," represent computer software instructions or groups of instructions. Diamond shaped elements (typified by element 40 in FIG. 3), are sometimes denoted herein as "decision blocks," and represent computer software instructions, or groups of instructions, which affect the execution of the computer software instructions represented by the processing blocks.

Alternatively, the processing and decision blocks may represent functions performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required of a particular apparatus or device. It should be noted that many routine program elements, such as initialization of loops and variables and the use of temporary variables are not shown. It will be appreciated by those of ordinary skill in the art that unless otherwise indicated, the particular sequence of blocks described in the flow diagrams is illustrative only and can be varied without departing from the spirit of the concepts, structures, and techniques described. Thus, unless otherwise stated the blocks described below are unordered meaning that, when possible, the functions represented by the blocks can be performed in any convenient or desirable order.

Figure 3:
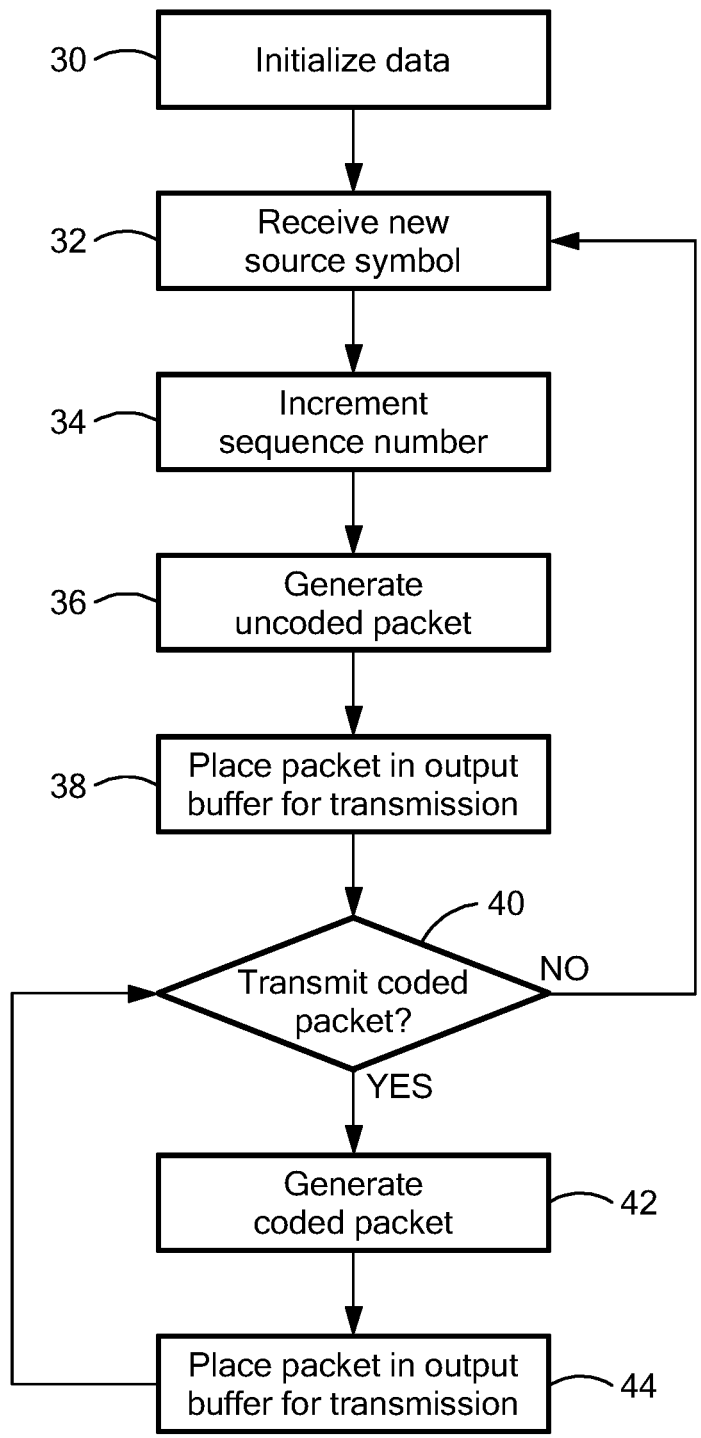
FIG. 3 is a flow diagram for the operation of an encoder in accordance with an embodiment.

Turning now to FIG. 3, an encoding method in accordance with an encoder embodiment (for example, the encoder shown in FIG. 1) begins with an initialization process 30. Illustrative embodiments use this initialization process 30 to reset an encoder sequence number to zero, for example, or to exchange data with a corresponding decoder to determine a round-trip time ("RTT") and thereby predetermine a fixed window size $w_e$. A person having ordinary skill in the art may appreciate other initialization that may be performed, and conventional methods for doing so.

The encoding method continues with a receiving process 32 that begins the main encoding loop. In this receiving process 32 the encoder receives a new input or source symbol. For example, the source symbol may be received as data from a computer network, or from an application program using an application programming interface (API) or using other conventional means.

Then, incrementing process 34 increments the encoder sequence number, and the encoder associates the newly received source symbol with the new sequence number. The association may include storing the source symbol in an input buffer in a memory location according to the sequence number, as described below in more detail. The incrementing process 34 enables the encoder to generate coded symbols.

Next, a packet generating process 36 generates an uncoded packet by attaching a header containing the current encoder sequence number. In one embodiment, most packets transmitted by the encoder are uncoded; that is, they lack a coefficient vector because they include an uncoded symbol. This embodiment permits relatively high code rates to be achieved. However, in another embodiment even uncoded packets include a coding header having a coefficient vector. In this embodiment, the coefficient vector has a length equal to the finite sliding window size $w_e$. Because the symbol is uncoded, the coefficient vector contains exactly one non-zero element of the finite field GF(q), for example the value 1. Illustratively, the non-zero element is located at position (ESN mod $w_e$), where ESN is the value of the encoder sequence number. Conventional means including a buffer or other memory may be used to generate the uncoded packet.

The method continues with a queueing process 38 that places the new uncoded packet hence formed in an output buffer. In illustrative embodiments, the method of FIG. 3 is performed asynchronously; that is, new packets are generated as quickly as source symbols are received, rather than waiting for existing packets to be delivered to the data channel. Thus, the queueing process 36 transfers the new uncoded packet to a shared output buffer accessible to another process for eventual delivery to the network. Of course, an alternate embodiment may operate in a synchronous manner, waiting until each packet is confirmed to have been transmitted toward the decoder before proceeding. Such asynchronous transfers may be performed using conventional means.

In accordance with the embodiment illustrated in FIG. 3, the method continues with a code rate checking process 40 that checks whether the transmission of one or more coded packets is required or desirable. The code rate checking process 40 can be performed by tracking a ratio of uncoded to total packets generated (i.e., code rate) to ensure that a given code rate is achieved. In one embodiment, the code rate checking process 40 returns a YES result when the current encoder sequence number is a multiple of a number N of uncoded packets to be sent for each coded packet, and NO otherwise. In this case, the code rate is calculated to be N/N+1. Of course, it should be clear how other code rates might be achieved using different tests.

If the transmission of a coded packet is not required, the main loop returns to its starting state, waiting for another source symbol in receiving process 32. However, if the transmission of a coded packet is required, the method proceeds to a coded packet generating process 42 that generates a coded packet. In illustrative embodiments, the encoder uses either systematic coding (that is, it includes the latest source symbol in a generated coded symbol) or sends redundant packets from within the FEC window illustrated in FIG. 2. The coded packet generating process 42 therefore includes generating a coefficient vector having one coefficient in GF(q) per source symbol in the sliding window to be coded.

Since the encoder uses a finite window, the number of packets linearly combined is usually equal to $w_e$, except in the initial stages of the transmission when there are fewer source symbols in the finite window (that is, when the encoder sequence number is less than $w_e$). The coded packet generating process 42 then linearly combines the source symbols in the finite sliding window using the generated coefficients and forms the coded packet by adding a coding header to the coded symbol.

The coding header contains a fixed number $w_e$ of coefficients and a packet sequence number (that may differ from the encoder sequence number). In one embodiment, the coefficient location is reused in a manner that makes the source symbol S associated with each coefficient implicit. This is done by placing the coefficient associated to source symbol S in position (ESN(S) mod $w_e$), where ESN(S) is the encoder sequence number associated with the source symbol S. Any empty coefficient slots get a zero coefficient. The coefficient vectors hence formed become the rows of the coefficient matrix (R) at the decoder, where the coefficient matrix (R) is the matrix used by the decoder to perform decoding, as detailed below.

Once the coded packet has been generated, a queueing process 44 places it in the output buffer. This queueing process 44 is like the queueing process 38 and may be performing in like manner. The method continues by determining whether to transmit an additional coded packet in the code rate checking process 40. If no further coded packet is required, then the method concludes its loop by returning to receiving process 32, in which it awaits the next source symbol.

Figure 4:
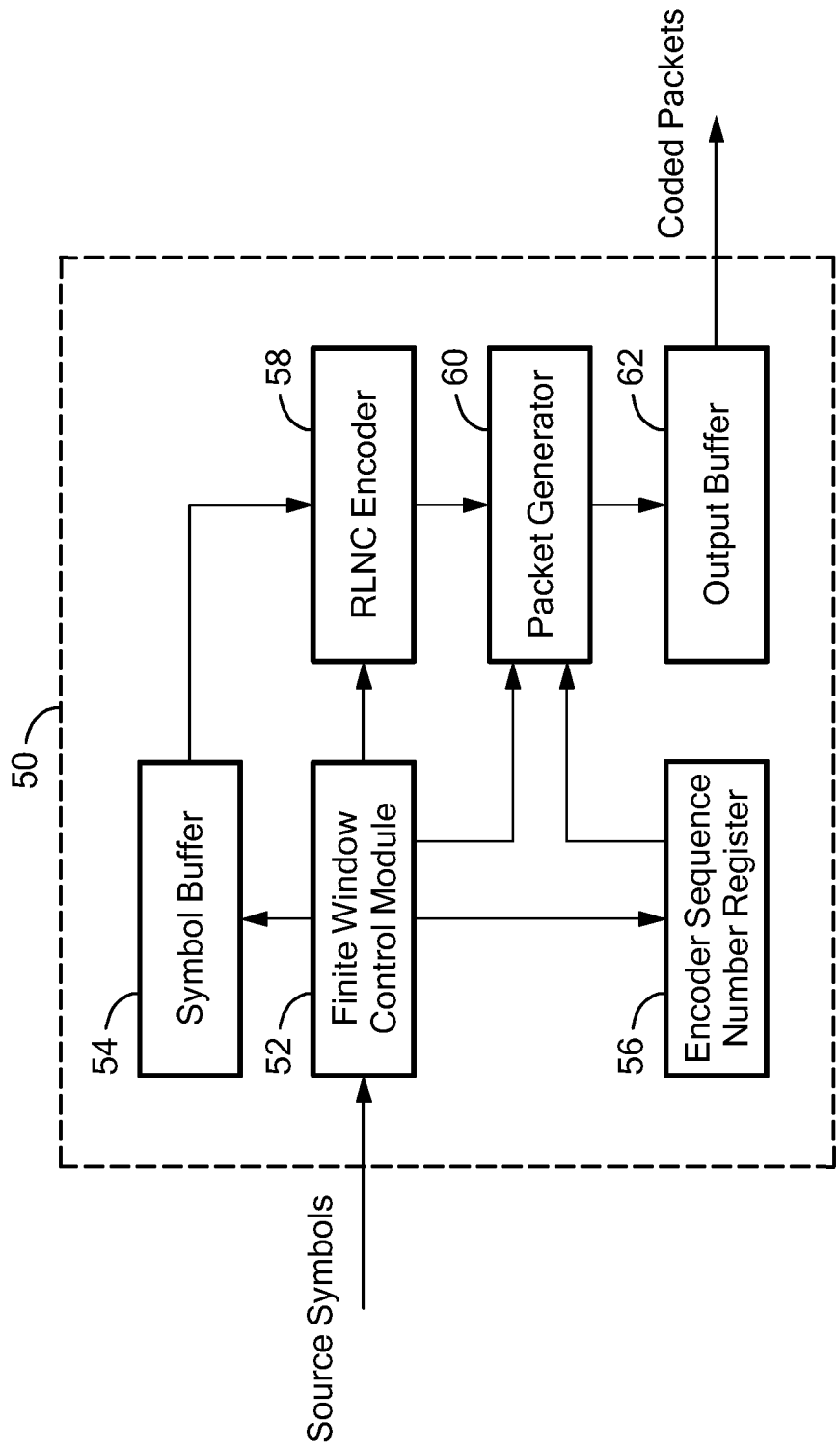
FIG. 4 is a diagram illustrating functional components in an encoder according to an embodiment of the concepts, systems, and techniques described herein.

Referring now to FIG. 4, an embodiment of the concepts described herein is an encoder 50 having several functional components that include a finite window control module 52, a symbol buffer 54, an encoder sequence number register 56, a random linear network coding ("RLNC") encoder 58, a packet generator 60, and an output buffer 62. The operation of these components is now described.

The finite window control module 52 is the principal mechanism for controlling the encoder 50. The finite window control module 52 receives source symbols and stores them in a symbol buffer 54. The symbol buffer 120 contains $w_e$ symbols, where $w_e$ is the size of the finite encoder sliding window, and the finite window control module 52 evicts stale symbols as they pass outside the window. This is done to respect the coding window size and control decoding complexity. Feedback may be received from a decoder that was unable to decode a symbol despite using the techniques described herein. When feedback is received, it will usually refer to a symbol having a sequence number that is less than that kept by the encoder. In this case, feedback information from symbols outside of the encoder's window size are discarded. The finite window control module 52 also stores and updates the encoder sequence number in an encoder sequence number register 56, as described in connection with FIG. 3.

The encoder 50 also includes an RLNC encoder 58 to compute the coded symbols found in a coded packet, for example as described above in process 42. For example, the Kodo library published by Steinwurf ApS of Denmark may be used for this purpose under the direction of the finite window control module 52.

A packet generator 60 creates uncoded and coded packets for transmission to a decoder or recoder. For uncoded packets, the packet generator 60 joins an uncoded symbol obtained from the finite window control module 52 to the associated sequence number stored in the encoder sequence number register 56. For coded packets, the packet generator 60 joins a coded symbol received from the RLNC encoder 58 to a coding header. The coding header includes the coefficient vector used to encode the coded symbol, obtained from the RLNC encoder 58. The coding header also includes a packet sequence number, i.e. the largest sequence number of any input symbol used in the encoding of the coded symbol as a linear combination of input symbols.

Finally, the encoder 50 includes an output buffer 62 that performs output functions (i.e., transmission, buffering, delivery to a lower protocol layer, and so on). The output buffer 62 receives generated packets from the packet generator 60. It should be appreciated that any or all the functional components in the encoder 50 may be implemented in hardware, firmware, software, or any combination of such technologies.

Figure 5:
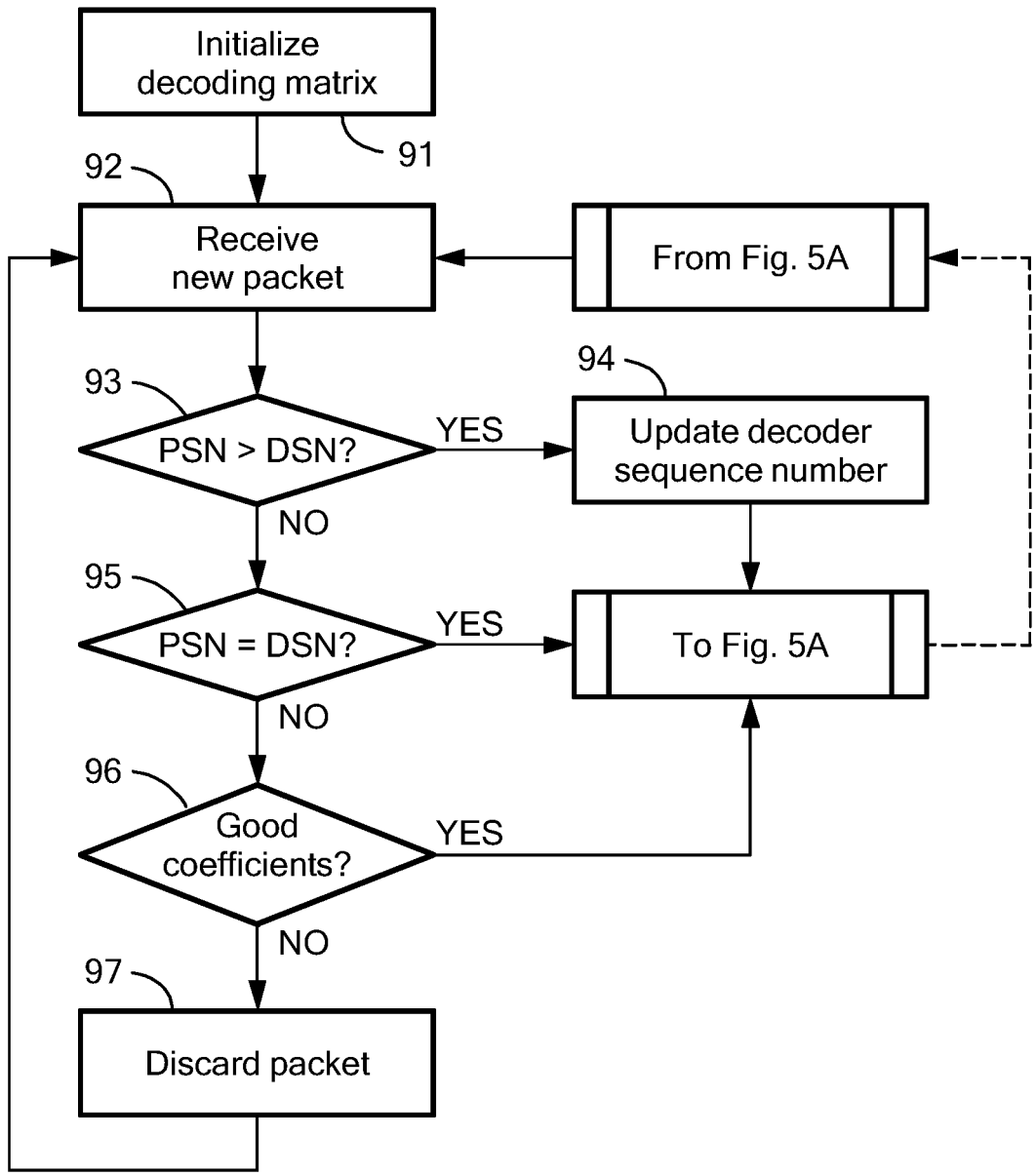
FIGS. 5 and 5A are a flow diagram for the operation of a decoder in accordance with an embodiment.

Referring now to FIG. 5, a decoding method in accordance with a decoder embodiment (for example, the decoder shown in FIG. 1) begins with an initialization process 91 that initializes a matrix used in decoding, as described in more detail below. As with the encoder initialization process 30, the decoder initialization process 91 also may initialize state variables, including setting a decoder sequence number to zero. Also, the decoder may exchange data with a corresponding encoder to determine a round-trip time ("RTT") and thereby determine the fixed sliding window size $w_e$ prior to exchanging data using the finite sliding window techniques described herein. A person having ordinary skill in the art may appreciate other initialization that may be performed, and conventional methods for doing so.

The matrix used in decoding has $w_d$ rows that each include a coefficient vector that indicates coefficients used to encode a different coded symbol, where $w_d$ has a fixed value and $w_d$ is greater than or equal to $w_e$. The first $w_e$ columns of such a matrix form the coefficient matrix (R) and may be reduced to an identity matrix by performing row operations (e.g. multiplying all coefficients in a row by the same number and adding or subtracting rows). As is known in the art, if corresponding row operations are performed on the associated coded symbols, this process results in decoded source symbols.

Some embodiments carry out row operations using a $w_d$-by-1 symbol matrix and a separate $w_d$-by-$w_e$ coefficient matrix (R) whose $w_d$ rows are coefficient vectors (of length $w_e$) of corresponding coded symbols. Other embodiments coordinate row operations using an "augmented" $w_d$-by-($w_e$+1) matrix, in which the first $w_e$ columns form the coefficient matrix (R) and comprise the $w_e$ coefficient vectors (for each of the $w_d$ symbols), whereas the last column (index $w_e$+1) comprises the associated symbols. Regardless of its form, this matrix is referred to hereinafter as the "coordinate matrix."

The decoding method of FIG. 5 continues with a receiving process 92 that begins the main decoding loop. In this receiving process 92 the decoder receives a new packet. For example, the packet may be received as data from a computer network, or from an application program using an application programming interface (API) or using other conventional means.

Next, the decoding method determines in decision processes 93, 95, and 96 a relationship between the received packet and the decoding state. The decoder must determine, among other things, whether a received packet refers to symbols having sequence numbers that are newer, older, or the same as recently identified symbols. Illustrative embodiments solve this problem by including a packet sequence number ("PSN") in the coding header of each coded packet and maintaining as part of the decoder state a decoder sequence number ("DSN"). In embodiments, the DSN may correspond to a largest PSN received by the decoder and may be compared against the most recently received PSN.

Thus, in newness decision process 93 the decoder determines whether the PSN of the received packet is larger than the DSN currently maintained by the decoder. This occurs when the received packet refers to a source symbol that was previously unknown to the decoder. If this is the case, then the method proceeds to an update process 94 in which the decoder sequence number is updated to reflect that the received packet had a higher sequence number.

Figure 6:
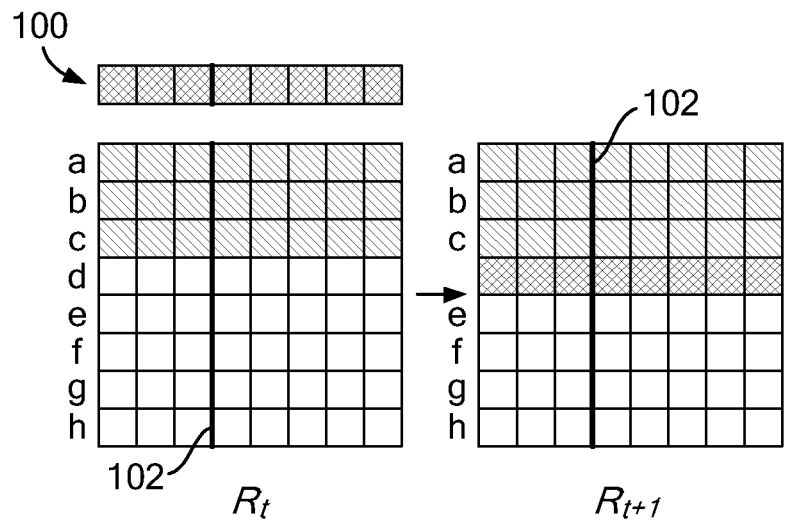
FIGS. 6, 6A, and 6B are a series of diagrams illustrating three different cases for inserting coefficients relating to a new coded symbol into a coefficient matrix.
Figure 6A:
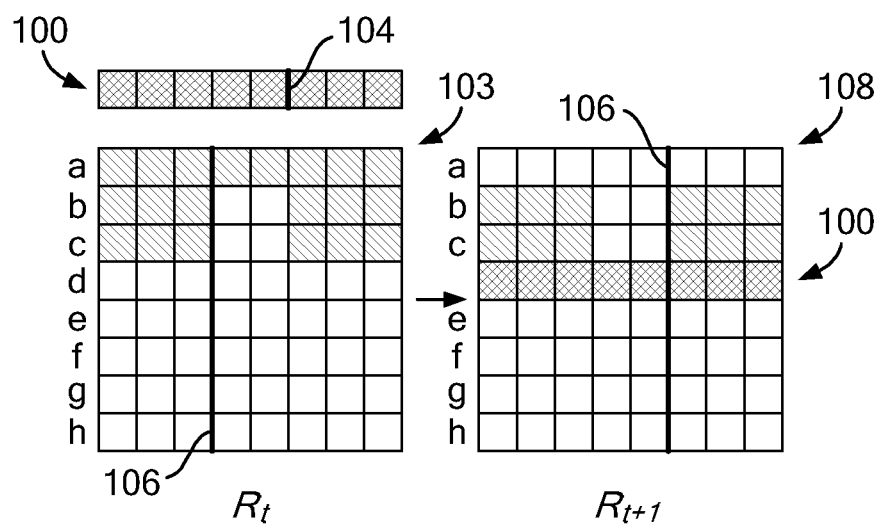
Figure 6B:
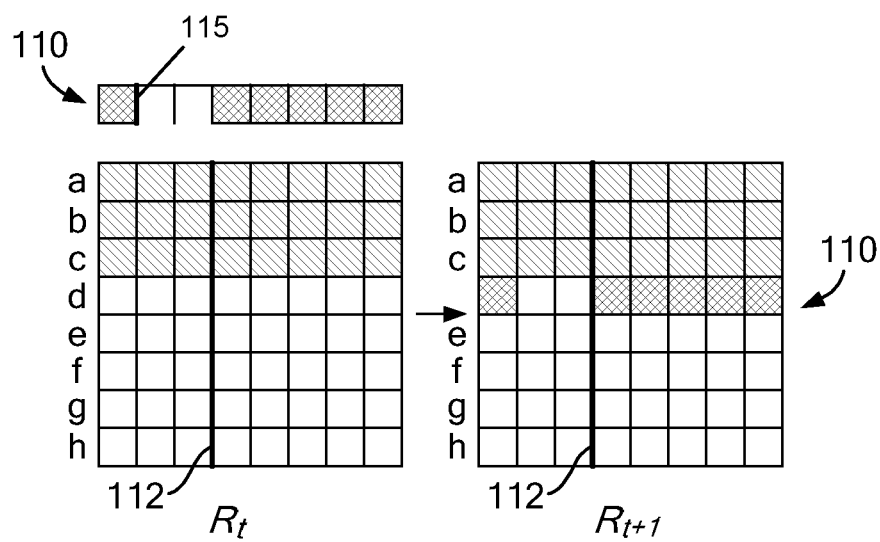

The update process 94 performs two important tasks, which may be more fully appreciated with reference to FIG. 6A, which illustrates a received coefficient vector 100 having a coefficient index 104 and the coefficient matrix 103 with decoder index 106, where wd=we=8. The coefficient index 104 is computed as (PSN mod we) and the decoder index 106 is computed as (DSN mod we). Shaded or crosshatched boxes in FIGS. 6, 6A, and 6B represent non-zero coefficients, and blank or unhatched boxes in these Figures represent zero coefficients.

Firstly, the update process 94 updates the DSN to equal the received PSN. The decoder must take this step because the received packet refers to a source symbol (having the received PSN) that was not previously known to the decoder. In FIG. 6A this is shown in updated coefficient matrix 108, which has moved the decoder index 106 two columns to the right to match the packet index 104.

However, increasing the DSN "shifts" the finite sliding window, which covers a range of sequence numbers that depends on the DSN. Thus, the coefficient matrix may now include rows whose coefficients refer to source symbols whose sequence numbers now lie outside the finite sliding window, so the second important task of the update process 94 is to evict from the coefficient matrix any rows of coefficients that refer to obsolete symbols (i.e., rows with a non-zero coefficient in a column associated with an obsolete source symbol). Deleting these rows can reduce the probability of decoding the new symbol. But this effect can be limited by performing a Gaussian elimination at every opportunity, as described below. Gaussian elimination will reduce the number of non-zero entries, and by this the probability to evict the symbol.

To illustrate eviction, with reference again to FIG. 6A, the decoder state prior to receiving the new coefficient vector 100 was a coefficient matrix with three rows of coefficients, and a decoder index equal to 2 (e.g. DSN=138). The first row includes coefficients for the symbols having all eight prior sequence numbers (e.g. sequence numbers 131 to 138, inclusive), so its corresponding coded symbol is a linear combination of all the respective source symbols. However, the second and third rows include non-zero coefficients only for the prior six symbols (e.g. sequence numbers 133 to 138, inclusive). Thus, after the decoder received the new coefficient vector 13 (included in a packet having PSN=140), the DSN increased by two (e.g. to 140, moving the sliding window to sequence numbers 133 to 140, inclusive). Since row a depends on symbols with sequence numbers 131 and 132, which are now outside the sliding window, row a is evicted from the coefficient matrix as indicated in the updated coefficient matrix 108. However, since rows b and c depend only on symbols with sequence numbers 133 to 138, they are not evicted. Once the decoder has updated its state as indicated, the method proceeds to FIG. 5A, which illustrates algebraic decoding.

Returning to newness decision process 93, if the PSN of the received packet is not larger than the DSN, then the method continues to sameness decision process 95, in which the decoder determines whether the PSN of the received coded packet is the same as the DSN. If so, then it is not necessary to update the DSN or the decoder index 15 and algebraic decoding may commence immediately, so the method proceeds to FIG. 5A as above. This situation is illustrated in FIG. 6.

If the PSN of the received packet is not even at least as large as the DSN currently known to the decoder, then the packet may refer to obsolete source symbols so the method proceeds to a staleness decision process 96, in which the decoder determines whether the received coefficient vector includes non-zero coefficients that refer to source symbols whose sequence numbers lie outside the current sliding window determined by the DSN. Thus, the staleness decision process 96 is like the eviction task of the update process 94, except that the received coefficient vector is not (yet) a row in the coefficient matrix.

Figure 5A:
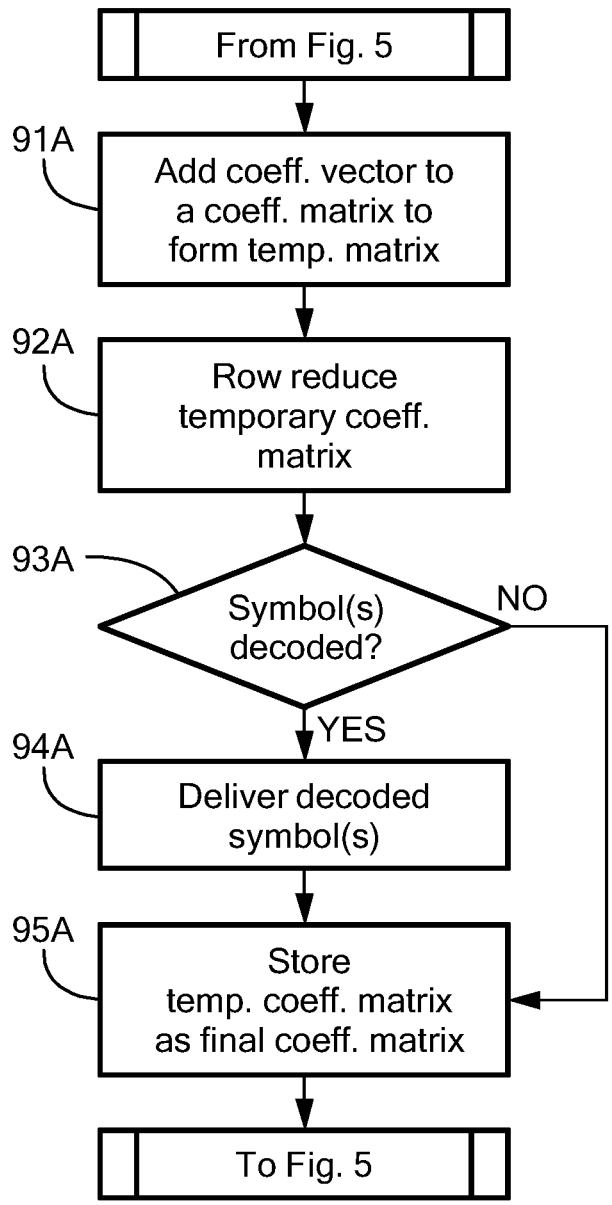

If the received packet includes a coded symbol that is a linear combination of only symbols still in the sliding window, as indicated by the received coefficient vector, then the method may proceed to FIG. 5A as indicated. Otherwise, in discarding process 97 the decoder discards the received coded packet as if it were an erasure and returns to the receiving process 92 to await arrival of the next packet. This situation is illustrated in FIG. 6B. For completeness, note that while the newly received coefficient vector 110 has a PSN 47 that is less than DSN 112 (as shown by the packet index 115 being to the left of the decoder index 112), nevertheless the coefficient vector 110 has non-zero coefficients only for symbols whose sequence numbers are at most six less than its PSN, and those six sequence numbers are within the eight sequence numbers, no greater than the DSN, that define the sliding window. Therefore, the coefficient vector 110 is not discarded.

Referring now to FIG. 5A, an algebraic decoding process begins with an adding process 91A, in which the coefficient vector of a received packet is added as a row to the coefficient matrix R to form a temporary coefficient matrix R', as indicated in FIGS. 6, 6A, and 6B. The coefficient matrix R' with the new row of coefficients may be stored in a temporary memory to permit linear algebra to be performed without losing the state R of the decoder.

If the received packet is an uncoded packet, it may lack a coefficient vector. In such a situation, the uncoded symbol contained therein may be represented as a linear combination of (zero times each of the other $w_e-1$ symbols) plus (1 times the uncoded packet index), with a corresponding coefficient vector. The adding process 91A adds this coefficient vector to the coefficient matrix R to form the temporary coefficient matrix R'. This adding process 91A is performed even for uncoded packets, because their symbols may be used to decode other coded symbols (for example, as described in connection with FIGS. 11-14C). Moreover, as the received packet contained an uncoded symbol, the method may send a copy of the uncoded symbol immediately as indicated to delivery process 94A, discussed below.

The method continues with a Gaussian elimination (row reduction) process 92A, in which the temporary coefficient matrix R' undergoes row reduction with pivoting, as that technique is known in the art. However, unlike the prior art 120 which begins pivoting from the first column (as shown in FIG. 7), an illustrative embodiment 124 begins pivoting from the decoder index column 122 corresponding to the DSN modulo the window size $w_e$ (as shown in FIG. 7A). Thus, the result of the row reduction process 92A is a coefficient matrix in "shifted" row echelon form.

The method continues to a decoding determination process 93A, in which the decoder determines whether any new source symbols were decoded by the row reduction process 92A. The result is YES when, as shown in FIG. 7A, the row-reduced temporary coefficient matrix R' includes an m-by-m identity submatrix, shifted to the right of the decoder index column, that is larger than a corresponding shifted n-by-n identity submatrix in the original coefficient matrix R. In this case, the row reduction process 92A successfully decoded m-n source symbols in order of their sequence numbers, and the method continues to delivery process 94A. Otherwise, the newly received coefficient vector did not decode additional source symbols in order, and the method continues to storing process 95A.

This algorithm provides a substantial efficiency gain over the prior art. The most likely scenario for an embodiment having a high code rate is that a newly received packet is uncoded and has a PSN that is exactly one larger than the current DSN. This entails that update process 94 will move the decoder index one column to the right and evict the first row of coefficients. As can be appreciated from FIG. 7A, performing these two actions preserves the "shifted" row echelon form of the coefficient matrix. Also, if the received packet is uncoded, then the uncoded symbol contained therein likely has the largest sequence number received by the decoder and may be delivered immediately. By contrast, performing Gaussian elimination in the traditional way would result in a coefficient matrix having an "unshifted" row echelon form, and such elimination would have to be performed anew after each newly received packet.

In the delivery process 94A the decoder delivers newly decoded source symbols to a symbol consumer. Such a consumer may be, for example, a software application, a symbol buffer, or some other device, system, or process. Finally, algebraic decoding concludes with a storing process 95A, in which the "shifted" row reduced coefficient matrix R' is stored as the coefficient matrix R.

Figure 8:
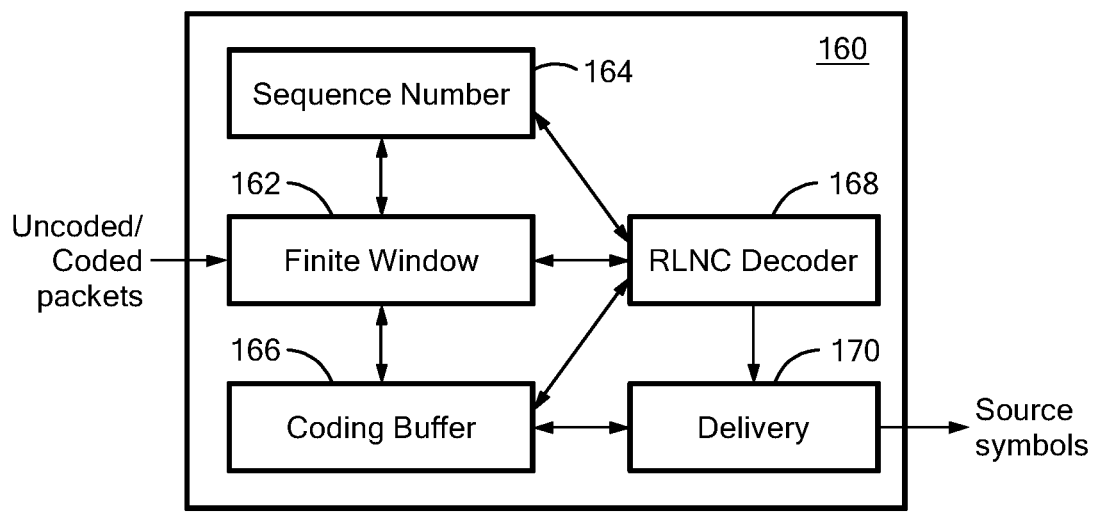
FIG. 8 is a diagram illustrating functional components in a decoder according to an embodiment of the concepts, systems, and techniques described herein.

Referring now to FIG. 8, an embodiment of these concepts is a decoder 160. The decoder 160 includes a finite window control module 162, a sequence number register 164, a coding buffer 166, a random linear network code ("RLNC") decoder 168, and a delivery module 170. The operation of these components is now described.

The finite window control module 162 is the principal mechanism for controlling the decoder 160. The finite window control module 162 receives uncoded and coded packets and maintains a decoder sequence number (DSN) in a decoder sequence number register 164. In various embodiments, it maintains the DSN according to the processes described above in connection with FIG. 5 and especially update process 94.

The finite window control module 162 stores received symbols, whether uncoded or coded, in a coding buffer 166. The coding buffer 166 contains $w_d$ symbols, where $w_d$ is the size of the decoder sliding window, and the finite window control module 162 evicts stale symbols as they pass outside the window. This may happen, for example, in accordance with the processes described above in connection with update process 94.

In some embodiments, when the decoder 160 is unable to decode a symbol despite using the techniques described herein, it may provide appropriate feedback to a respective encoder. When feedback is sent, it will refer to an undecoded symbol by sequence number.

The decoder 160 also includes an RLNC decoder 168 to compute source symbols from the coded symbols found in a coded packet, for example as described above in connection with FIG. 5A. For example, the Kodo library published by Steinwurf ApS of Denmark may be used for this purpose under the direction of the finite window control module 162.

Finally, the decoder 160 includes a delivery module 170 that performs output functions (i.e., buffering, delivery to a higher protocol layer, and so on). The delivery module 170 receives uncoded source symbols from the coding buffer 166, and decoded source symbols from the RLNC decoder 168. It should be appreciated that any or all the functional components in the decoder 160 may be implemented in hardware, firmware, software, or any combination of such technologies.

Various embodiments of the invention also perform recoding. Recoding is the operation of creating new coded packets from previously coded and uncoded "source" packets without necessarily decoding the coded packets first. This typically entails (1) applying the linear combination to the payload, (2) computing the new coded coefficients from the coefficients of the source packets, and (3) adding the new coded coefficients to the newly recoded packet. Recoding usually occurs at intermediate nodes to improve connection performance through (1) increasing the diversity of coded packets (i.e., number of source symbols that are part of the linear combination) or (2) injecting new coded packets to cover for losses in subsequent links. Recoding finds important applications in multipath communications and channel bonding (e.g. LTE+Wi-Fi), mesh networks, and opportunistic routing for serial links.

In general, a recoder should apply the same filter mechanisms for feedback and source packets. When combining multiple symbols with sparse coefficient vectors, the resulting coefficient vector contains more and more non-zero elements. If those non-zero elements exceed the window size, the packets become useless. To avoid that problem, recoders can resort to the following mechanisms:

Recoded packets should be sparse, e.g. non-zero coefficients should be in an FEC window. This can be enforced by applying a rule prohibiting recoding among packets with sequence numbers that are too far apart (i.e., the difference exceeds the window size). The window size can be different from the source/destination window size and can be communicated by another node (e.g., source, destination, network management) or inferred by the recoder itself from source-destination traffic or some other available metric.

Recoders may adjust the rate of injected recoded packets into the stream (i.e., towards the destination) in response to the packet losses rate in the next hop or over the remainder of the network. The loss rate can be communicated by another node (e.g., source, destination, network management) or inferred by the recoder itself from source-destination traffic or some other available information such as Channel State Information (CSI).

In general, a recoder may base its decision to transmit additional packets and the way it mixes packets on received or inferred state information about the sliding window, the state of the transfer, as well as channel, link, or next-hop quality. A recoder may also consider decoding complexity when coding packets together, thus refraining from recoding or creating a packet that has reached a target number of native mixed packets, even if all symbols are still within the encoding sliding window. A recoder may inform its upstream neighbors of received/missing/seen symbols/degrees of freedom, thus informing them of its received symbols as well as link quality, where seen symbols are source symbols yet to be decoded that are part of a received linear combination, and missing degrees of freedom represent the number of independent coded symbols that are required for the decoding of a given source symbol or generation.

A recoder may intercept and terminate a request from downstream nodes (e.g. destination) for additional packets or degrees of freedom if it is able to satisfy that request through the transmission of a recoded, coded, or source symbol. Recoders may decode opportunistically and on the fly to make their stored symbols sparser. This is only possible if recoders receive sufficient packets. And recoders may allow 'easy' recoding without partial decoding by combining incoming subsequent packets while the FEC window remains constant or is marginally increased. Recoding may allow adapting to the next link's required coding rate, which may be different from previous link coding rates (both higher and lower).

Figure 9:
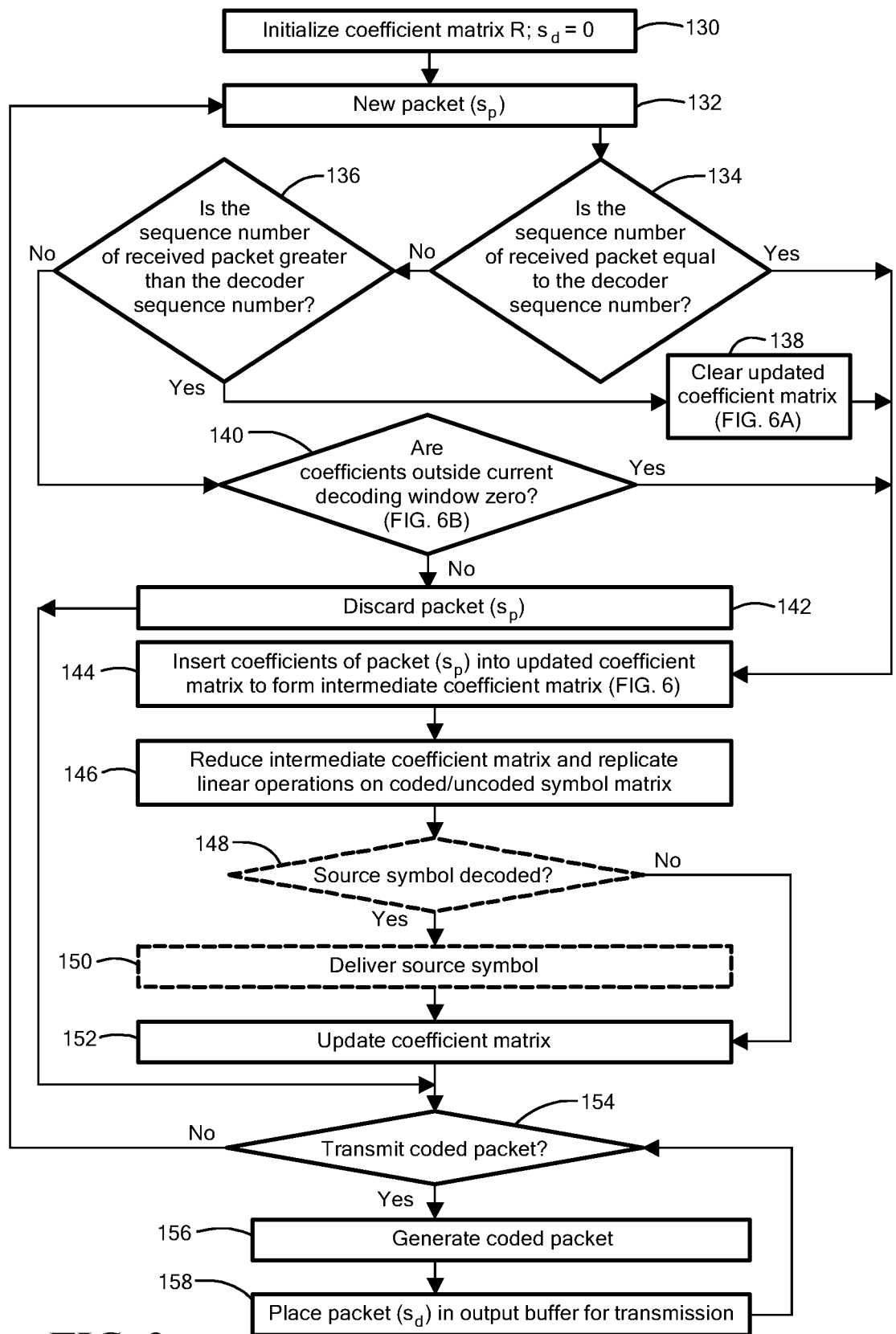
FIG. 9 is a flow diagram for the operation of a recoder in accordance with an embodiment.

Thus, referring now to FIG. 9, a recoding method in accordance with a recoding embodiment (such as the recoder shown in FIG. 1) includes decoding processes 130 to 142 illustrated in FIG. 5, decoding processes 144 to 152 illustrated in FIG. 5A, and encoding processes 154 to 158 illustrated in FIG. 3. In detail, the processes 130, 132, 134, 136, 138, 140, and 142 of FIG. 9 correspond respectively to the initialization process 91, receiving process 92, sameness decision process 95, newness decision process 93, update process 94, staleness decision process 96, and discarding process 97 of FIG. 5. These processes 130 to 142 therefore collectively perform the decoding processes of FIG. 5, in the same order, with the non-functional difference of making the sameness decision 134 before 136 instead of after. The only functional difference is that after the discarding process 142, the method of FIG. 9 does not return to process 132 in direct correspondence with the method of FIGS. 5 and 5A, but instead proceeds to encoding processes 154 to 158.

Also, the processes 144, 146, 148, 150, and 152 of FIG. 9 correspond respectively to the adding process 91A, row reduction process 92A, decoding determination process 93A, delivery process 94A, and storing process 95A. These processes 144 to 152 therefore collectively perform the decoding processes of FIG. 5A, in the same order, with the only functional differences being that the determination process 148 and delivery process 150 are performed optionally in some decode-and-forward embodiments (as indicated by their appearances in dashed outline), and that the storing process 152 does not return to process 132 in direct correspondence with the method of FIGS. 5 and 5A but instead proceeds to encoding processes 154 to 158.

The processes 154 to 158 of FIG. 9 correspond respectively to the code rate checking process 40, coded packet generating process 42, and queueing process 44 of FIG. 3. These processes 154 to 158 therefore collectively perform the coded packet generation processes of FIG. 3 (but not the uncoded packet generation processes), in the same order, with no functional differences.

Figure 10:
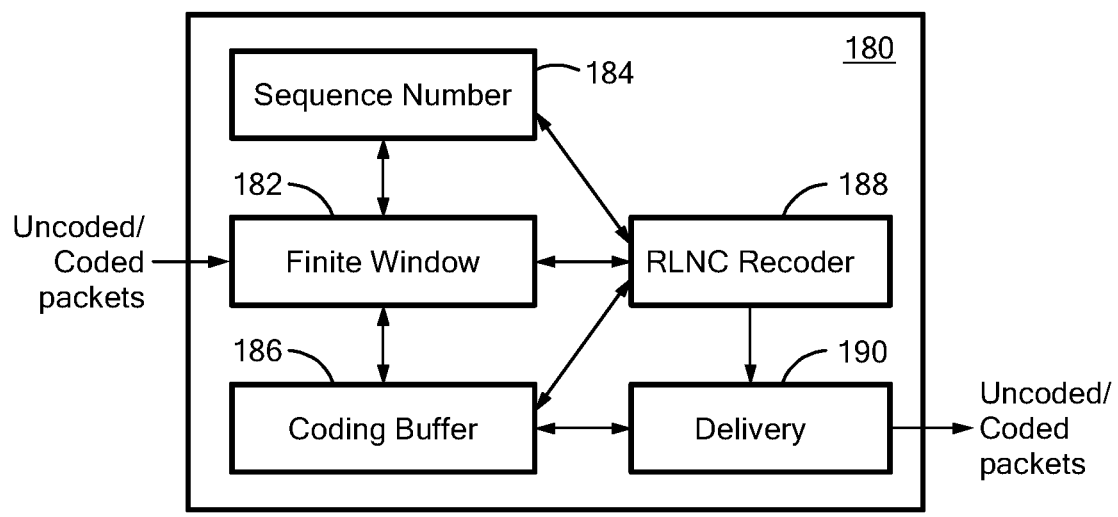
FIG. 10 is a diagram illustrating functional components in a recoder according to an embodiment of the concepts, systems, and techniques described herein.

Referring now to FIG. 10, an embodiment of the concepts described herein is a recoder 180 that includes a finite window control module 182, a sequence number register 184, a coding buffer 186, a random linear network code ("RLNC") recoder 188, and a delivery module 190. The operation of these components is now described.

The finite window control module 182 is the principal mechanism for controlling the recoder 180. The finite window control module 182 receives uncoded and coded packets and maintains a recoder sequence number (RSN) in a recoder sequence number register 184. In various embodiments, it maintains the RSN according to the processes described above in connection with FIG. 5 and especially update process 94 for updating a decoder sequence number (DSN).

The finite window control module 182 stores received symbols, whether uncoded or coded, in a coding buffer 186. The coding buffer 186 contains up to $w_d$ symbols, where $w_d$ is the size of the (partial) decoder sliding window, and the finite window control module 182 evicts stale symbols as they pass outside the window. This may happen, for example, in accordance with the processes described above in connection with update process 94.

The recoder 180 also includes an RLNC recoder 188 to row reduce the coded symbols found in respective coded packets (for example as described above in connection with FIG. 5A) and generate and forward recoded packets as described above in connection with FIG. 3. For example, the Kodo library published by Steinwurf ApS of Denmark may be used for this purpose under the direction of the finite window control module 182.

In accordance with some embodiments, the RLNC recoder 188 does not perform partial decoding at all, but instead performs cumulative network encoding by transmitting coded packets whose successive coded symbols are linear combinations of increasingly many input symbols. Thus, the RLNC recoder 188 may generate a new coded symbol $S_{n+1}$ from a previous coded symbol $S_n$, a coefficient C, and a newly received input symbol S using the iterative formula $S_{n+1}=S_n+C \cdot S$, where the addition and multiplication are performed in the finite field GF(q). In this way, the recoder 180 may increase or decrease the number of input symbols used to form a coded symbol; that is, the finite sliding window size $w_e$. This change advantageously permits the recoder 180 to forward packets between data channels for which different channel characteristics require different code rates.

Finally, the recoder 180 includes a delivery module 190 that performs output functions (i.e., buffering, delivery to a higher protocol layer, and so on). The delivery module 190 receives recoded packets from the RLNC recoder 188 and forwards them to a downstream coder or node. It should be appreciated that any or all the functional components in the recoder 180 may be implemented in hardware, firmware, software, or any combination of such technologies.

Figure 11B:
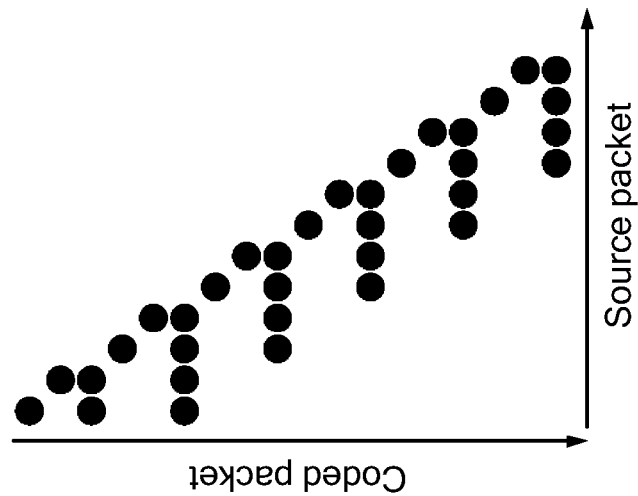
FIGS. 11, 11A, and 11B are a series of diagrams illustrating examples for compared coding schemes having a code rate R=⅔.
Figure 11A:
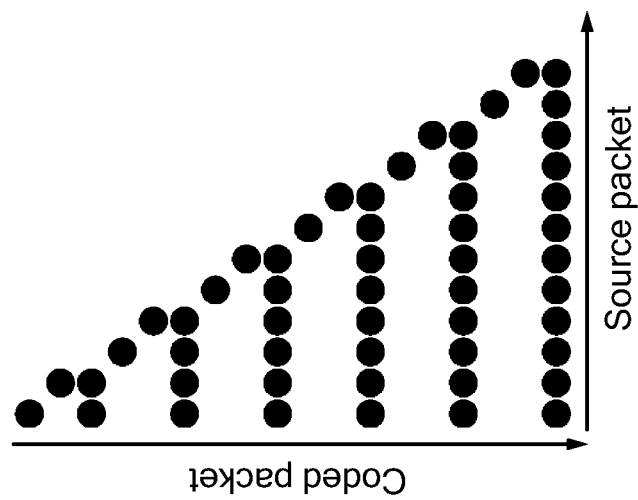
Figure 11:
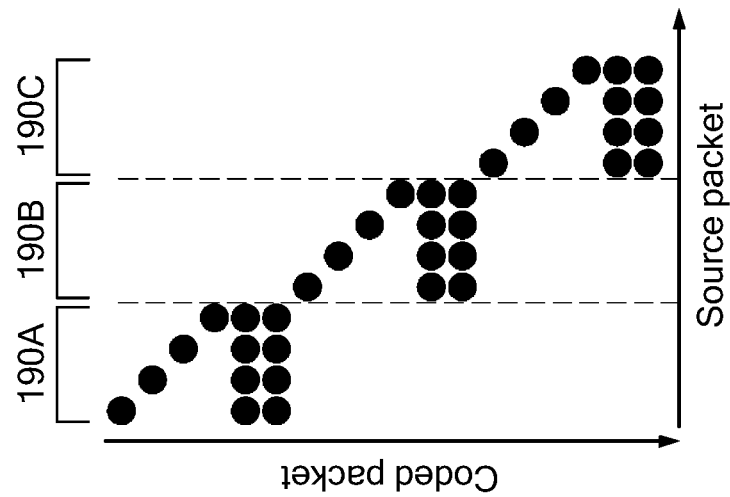

Referring now to FIGS. 11, 11A, and 11B, a comparison is drawn between packet contents in the prior art techniques of plain systematic block codes (FIG. 11) and infinite sliding window (FIG. 11A), and the finite sliding window technique described herein (FIG. 11B). Each such figure indicates transmitted (coded) packets in rows by order of transmission. Each row indicates by dots which source symbols (or source packets) are encoded by linear combination in the respective coded packet. Moreover, each figure provides for the transmission of two uncoded symbols for each (redundant) coded symbol, and therefore illustrates a code having a code rate of ⅔.

The systematic block code of FIG. 11 shows three generations 190a, 190b, 190c of symbols. The first four transmitted packets are uncoded, and include source symbols numbered 1, 2, 3, and 4 in order. The fifth and sixth packets are coded and contain linear combinations of these source symbols which may be used to recover the source symbols in the presence of at most two erasures from among any of the six transmitted packets. Such recovery is discussed below in connection with FIG. 12. Having transmitted the first generation of symbols numbered 1 to 4 in the first six packets, the next six packets transmit a second generation of symbols numbered 5 to 8, the next six packets transmit a third generation of symbols numbered 9 to 12, and so on.

The infinite sliding window code 68 of FIG. 11A repeats a pattern of two uncoded packets followed by a packet containing a coded symbol that is a linear combination of all (or some dynamic subset of all) preceding source symbols. Thus, the first two transmitted packets are uncoded and include source symbols numbered 1 and 2. The third packet is coded and contains a linear combination of all preceding source symbols, numbered 1 to 2. The next two packets are uncoded and include source symbols numbered 3 and 4. The sixth packet is coded and contains a linear combination of all preceding source symbols, numbered 1 to 4, and so on.

Referring now to FIG. 11B, the basic concept of the Sliding Window approach is described. We don't consider the feedback or multipath yet, and only consider a single link. The FEC window size is omitted, as FEC is more useful when packets are sent over different paths and reordering is expected, or when feedback is available. Thus, coding occurs over the whole generation.

In accordance with embodiments of the concepts and techniques described herein, the finite sliding window code of FIG. 11B repeats a pattern of two uncoded packets followed by a packet containing a coded symbol that is a linear combination of at most a fixed window number $w_e$ of preceding source symbols. The finite sliding window code of FIG. 11B combines the advantageous simplicity and storage bounds of systematic block codes lacking in infinite sliding window codes, with the advantageous reduced decoding latency of infinite sliding window codes with respect to systematic block codes.

Figure 12:
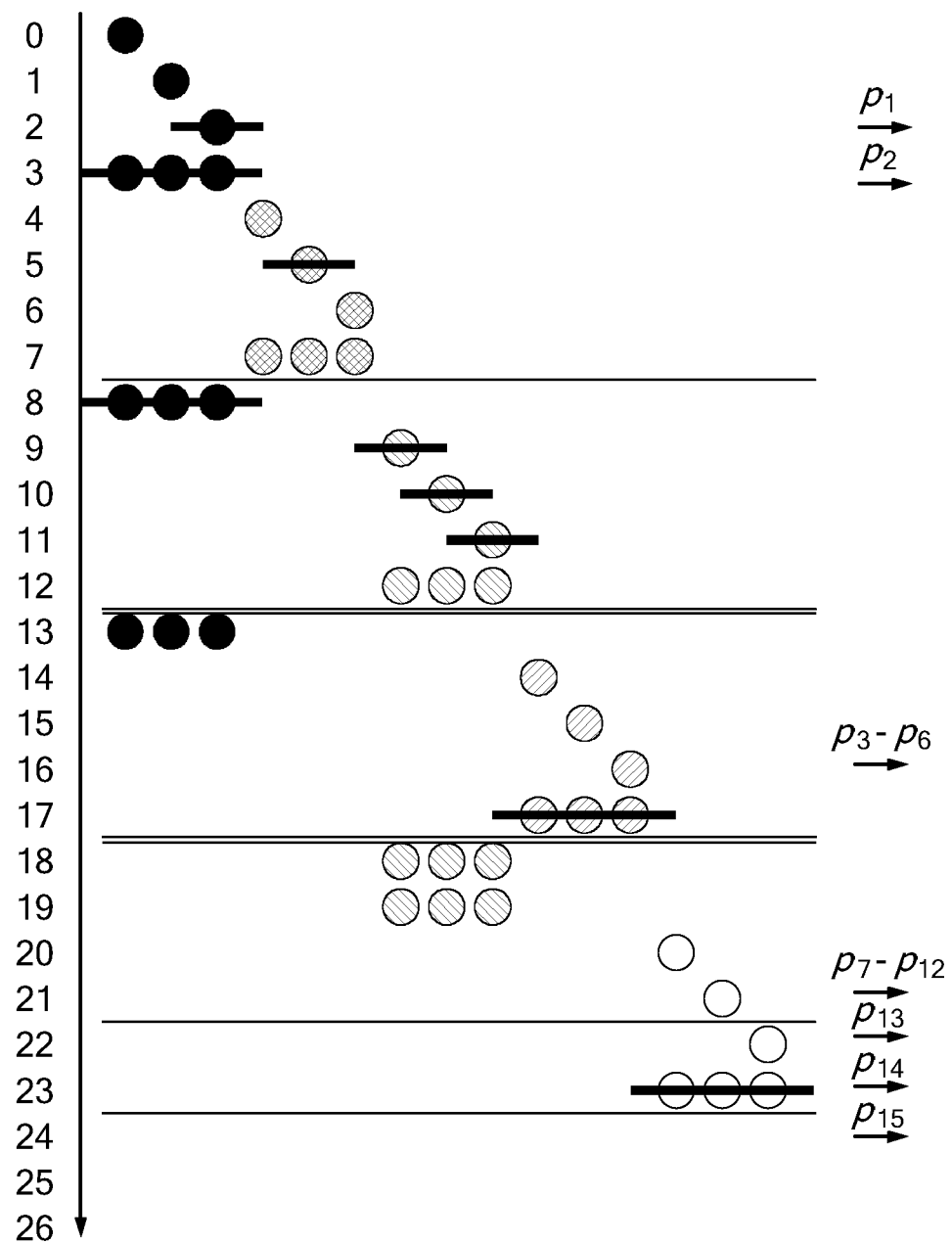
FIG. 12 is a diagram illustrating a generalized S-ARQ.

FIG. 12 illustrates source symbol decoding using a prior art selective-automatic-repeat-request (S-ARQ) technique with a systematic block code having generations as in FIG. 11. In this exemplary figure, 24 packets were transmitted by an encoder, but only 15 packets were received by a decoder due to packet erasures, indicated by rows whose dots are struck through. Source symbols are provided in generations of three.

FIG. 12 may be understood as follows. Uncoded packet 0 containing symbol 1 was received by the decoder, permitting delivery in order of symbol 1 to the local coder for further processing (e.g. at a higher protocol layer). Uncoded packet 1 containing symbol 2 was received, permitting delivery in order of symbol 2. Uncoded packet 2 containing symbol 3 was erased, as was coded packet 3 containing a coded symbol. Thus, source symbol 3 could not be delivered in order.

In the second generation, uncoded packet 4 containing symbol 4 was received, but symbol 4 could not be delivered in order because symbol 3 was pending delivery. Likewise, uncoded packet 5 (symbol 5) was erased, uncoded packet 6 (symbol 6) was received, and coded packet 7 was received, permitting recovery of the erased symbol 5.

However, none of the decoded symbols 110 could be delivered in order because symbol 3 was still pending delivery. Therefore, the decoder requested at the first feedback juncture (indicated by the horizontal line after packet 7) that the encoder transmit a new, linearly-independent, coded symbol for the first generation.

For the third generation, the encoder transmitted this coded symbol in coded packet 8, but this packet was also erased. The encoder proceeded to transmit uncoded packets 9, 10, and 11 (source symbols 7, 8, and 9; all erased), and coded packet 12 that was received. As coded packet 8 was erased, at the second feedback juncture the decoder again requested transmission of a coded symbol for the first generation.

For the fourth generation, the decoder finally received its needed coded symbol in coded packet 13. Receipt of coded packet 13 permitted recovery (and delivery) of symbol 3. As source symbols 4, 5, and 6 were already decoded, they were also then delivered. The decoder then received uncoded packets 14, 15, and 16 respectively containing symbols 10, 11, and 12. However, these symbols could not be delivered, pending delivery of erased symbols 7, 8, and 9. Since the decoder obtained one coded symbol in packet 12 out of a generation of three, it requested 3−1=2 more linearly independent coded symbols for the third generation.

For the fifth generation, the decoder received its needed coded symbols for generation three in coded packets 18 and 19. Given the three linearly-independent coded symbols of packets 12, 18, and 19, Gaussian elimination (as discussed below) permitted the decoder to recover the three source symbols 7, 8, and 9, which were immediately delivered with previously obtained symbols 10, 11, and 12. Finally, the decoder was able to immediately deliver source symbols 13, 14, and 15 after receiving corresponding uncoded packets 20, 21, and 22. The erasure of coded packet 23 did not affect delivery of these symbols.

Figure 13:
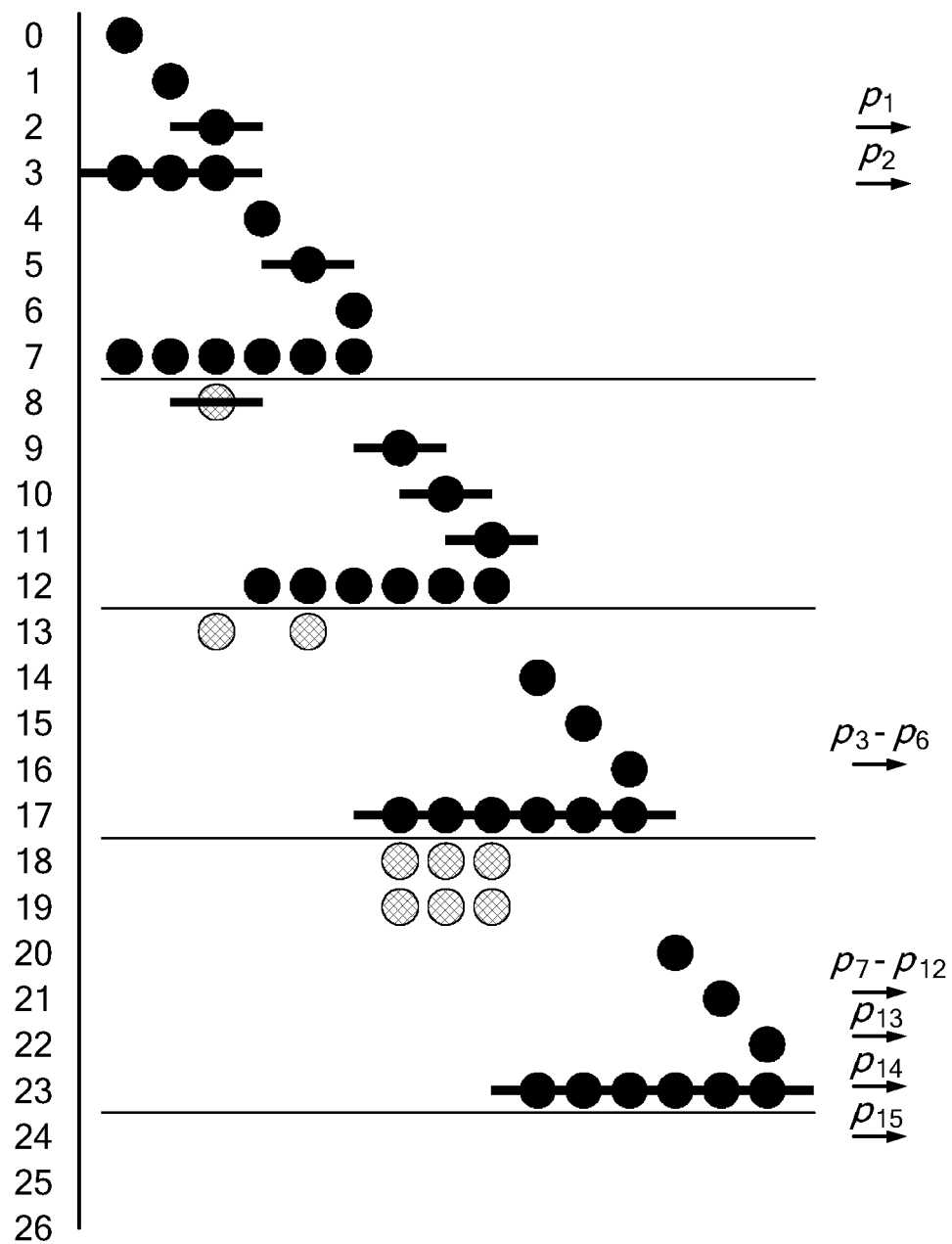
FIG. 13 is a diagram illustrating a sliding window S-ARQ proposal.

FIG. 13 illustrates source symbol decoding using a modified S-ARQ technique in accordance with an embodiment of the finite sliding window concepts described herein. The decoder processes the packet sequence using both the encoder's sliding window and a smaller sliding FEC window contained therein, as shown in FIG. 2. In the exemplary packet sequence of FIG. 13, an FEC window of six symbols (i.e. two generations) is used to provide forward error correction. The FEC window design shown in FIG. 1 allows for feedback to be received by the encoder while the sliding window still allows for retransmissions because the requested packets are still in the encoder's sliding window.

A decoder processing the packet sequence of FIG. 13 receives uncoded packets 0, 1, 4, and 6, and coded packet 7 (containing a linear combination of symbols 1 to 6), while packets 2, 3, and 5 were erased. Thus, source symbols 1 and 2 were delivered, pending symbols 3 and 5 were unknown, and pending symbols 4 and 6 were known but undeliverable. At the first feedback juncture after the second generation, the decoder had five packets for the six symbols in the first two generations. It thus requested transmission of 6−5=1 additional packet containing a linear combination of the unknown symbols from the first generation (i.e. the source symbol 3).

For the third generation, uncoded packet 8 containing symbol 3 was erased, as were uncoded packets 9, 10, and 11, while packet 12 containing a linear combination of symbols 4 to 9 was received. Thus, pending symbols 3, 5, 7, 8, and 9 were unknown and pending symbols 4 and 6 remained known but undeliverable. As the decoder still had only five packets for the six symbols in the first two generations, it requested transmission of 6−5=1 additional packet containing a linear combination of the unknown symbols from the first two generations (i.e. the symbols 3 and 5).

For the fourth generation, the decoder received coded packet 13. Combined with received packets 0, 1, 4, 6, and 7, coded packet 13 made six packets ($w_d$=6) associated with six source symbols ($w_e$=6). Since $w_d \geq w_e$, according to basic linear algebra the linear combinations in these packets yielded a system of equations that could be solved to recover the source symbols 1 to 6. Thus, the unknown pending symbols numbered 3 and 5 were recovered and delivered with symbols numbered 4 and 6. Pending symbols 7, 8, and 9 were unknown and pending symbols 10, 11, and 12 were known but undeliverable.

After receiving uncoded packets 14 to 16 but not coded packet 17, the decoder had four packets (numbered 12, 14, 15, and 16) for the six symbols in generations three and four. It therefore requested transmission of 6−4=2 additional packets containing (linearly independent) linear combinations of the unknown symbols from these generations (i.e. the symbols 7, 8, and 9). Note that coded packet 12 counted toward generation three, because its coded symbol spanned generations two and three but all source symbols in generation two were known and could be subtracted from the linear combination.

For the fifth generation, the decoder received coded packets 18 and 19, rounding out the six packets needed to decode the six source symbols in generations three and four. It thereby recovered unknown symbols 7, 8, and 9, which it delivered with known symbols 10, 11, and 12. Finally, it delivered source symbols 13, 14, and 15 immediately upon receiving the respective uncoded packets 20, 21, and 22.

Note that the embodiment of FIG. 13 is generational, whereas the embodiments of FIGS. 6 and 7 may be generation-less, demonstrating that the finite sliding window techniques described herein may be applied in either case. Also note that after each generation, feedback is provided regarding only symbols that are part of the finite sliding window. For example, packet 12 is a linear combination of source symbols 4-9, the six last symbols of the sliding window (that is, the symbols inside the FEC window). Upon receiving feedback, the encoder sends packet 13, a linear combination of missing packets 3 and 5. In this case, although symbol 3 is outside the FEC window, it is still within the encoder's sliding window, hence it can be included in packet 13.

Embodiments according to FIG. 13 have differences to and advantages over the prior art erasure coding of FIG. 12. The packet sequence of FIG. 13 erases the same numbered packets as the sequence of FIG. 12, but the contents of each packet are different. Note also that FIGS. 12 and 13 both indicate delivery of source symbol 1 after packet 0, symbol 2 after packet 1, symbols 3 to 6 after packet 13, and so on, and the decoders of FIGS. 12 and 13 both have similar complexity and storage bounds. However, advantageously the decoder of FIG. 13 executes faster because it has the decoding delay of a sliding window code rather than a systematic block code.

Figures 14, 14A, 14B, 14C:
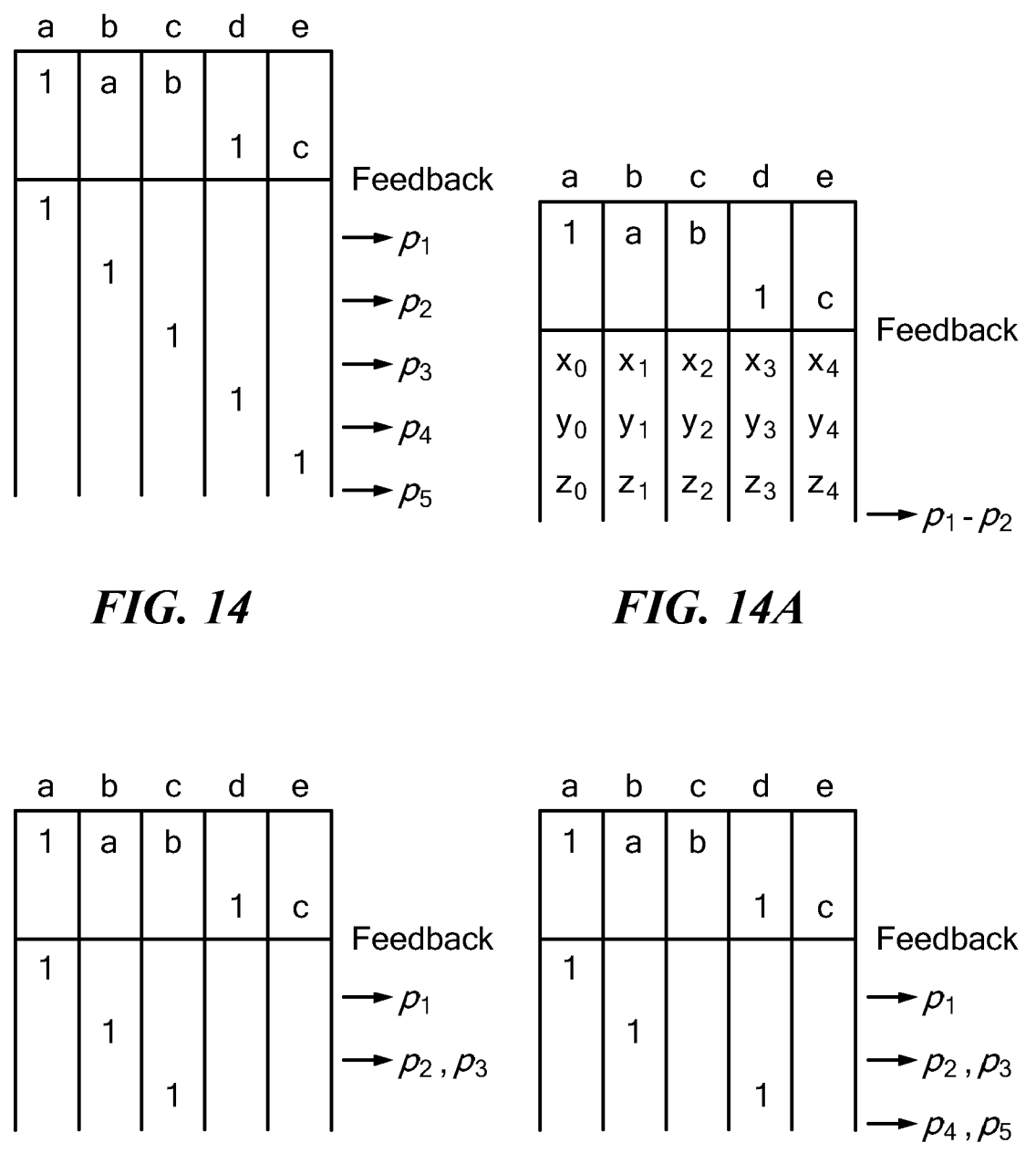

FIGS. 14, 14A, 14B, and 14C show four different applications of the feedback mechanism with the finite sliding window concepts described herein, where the decoding window size is $w_d$=5 and the decoding coefficient matrix contains at least two received coefficient vectors (1,a,b,0,0) and (0,0,0,1,c). In each figure, the five source symbols indicated by column labels a, b, c, d, and e correspond to symbols carried by packets $p_1$, $p_2$, $p_3$, $p_4$, and $p_5$, respectively, and the horizontal line indicates a feedback request, as in FIGS. 12 and 13. FIGS. 14A and 14C illustrate applications for which lower latency and more flexibility, in the form of throughput/efficiency vs. delay tradeoffs, are expected.

In FIG. 14, ARQ is applied at a higher layer. Since none of the source symbols were delivered to the ARQ layer, the decoder feedback requests all five source packets, hence the retransmission of $p_1$, $p_2$, $p_3$, $p_4$, and $p_5$. FIGS. 14A, 14B, and 14C show more efficient combinations of feedback with the finite sliding window concepts described herein, where feedback is integrated with the coding layer.

In FIG. 14A, instead of requesting all source symbols, the decoder feedback process requests three fully encoded packets (i.e., three packets where all symbols in the sliding window are combined). The three received packets enable the decoding of all source symbols upon reception of the third coded packet, because the decoder has five packets that contain five linearly independent combinations of these five source symbols.

FIG. 14B shows a configuration where retransmitted packets are systematic (i.e., uncoded). Unlike FIG. 14, the retransmitted packets in FIG. 14B can be used by the decoder. Hence, the decoder can deliver $p_3$ along with $p_1$ after decoding its first stored packet (1,a,b,0,0). However, redundant packets are delivered after the third packet is received.

FIG. 14C shows an optimal configuration where the decoder feedback requests systematic (i.e., uncoded) packets but is aware of the packets present in the decoder coefficient matrix. Hence, only packets $p_1$, $p_2$, and $p_4$ are requested, allowing for delivery of all packets by the third received retransmission. While both the schemes in FIGS. 14A and 14B can deliver all packets upon the third received retransmission, the scheme in FIG. 14C performs better as it delivers some of the packets earlier (e.g., $p_1$, $p_2$, and $p_3$) and requires fewer decoding operations due to the systematic nature of the retransmissions.

Thus, it may be appreciated that the finite window concept described herein allows for a systematic code which inserts redundant or coded packets from time to time, enabling minimal delay. Especially in the feedback case, the decoder may request packets increasing the probability of decoding if the encoder would send them systematically. Of course, the encoder can additionally send redundant or coded packets, as depicted in FIG. 14A.

The techniques and structures described herein may be implemented in any of a variety of different forms. For example, features of the concepts, systems, and techniques described herein may be embodied within various forms of communication devices, both wired and wireless; television sets; set top boxes; audio/video devices; laptop, palmtop, desktop, and tablet computers with or without wireless capability; personal digital assistants (PDAs); telephones;

pagers; satellite communicators; cameras having communication capability; network interface cards (NICs) and other network interface structures; base stations; access points; integrated circuits; as instructions and/or data structures stored on machine readable media; and/or in other formats. Examples of different types of machine readable media that may be used include floppy diskettes, hard disks, optical disks, compact disc read only memories (CD-ROMs), digital video disks (DVDs), Blu-ray disks, magneto-optical disks, read only memories (ROMs), random access memories (RAMs), erasable programmable ROMs (EPROMs), electrically erasable programmable ROMs (EEPROMs), magnetic or optical cards, flash memory, and/or other types of media suitable for storing electronic instructions or data.

In the foregoing detailed description, various features of the concepts, systems, and techniques described herein are grouped together in one or more individual embodiments for streamlining the disclosure. This method of disclosure is not to be interpreted as reflecting an intention that the claimed concepts, systems, and techniques described herein requires more features than are expressly recited in each claim. Rather, inventive aspects may lie in less than all features of each disclosed embodiment.

Having described implementations which serve to illustrate various concepts, structures, and techniques which are the subject of this disclosure, it will now become apparent to those of ordinary skill in the art that other implementations incorporating these concepts, structures, and techniques may be used. Accordingly, it is submitted that that scope of the patent should not be limited to the described implementations but rather should be limited only by the spirit and scope of the following claims.

What is claimed is:

1. A method of decoding packetized data in the presence of packet erasures, the method comprising, by a decoder, repeatedly:
   receiving a coded packet comprising a packet sequence number, a coefficient vector having a fixed length w, and a coded symbol encoded as a linear combination of w input symbols using the coefficient vector;
   determining whether the packet sequence number is within a sliding window of w consecutive sequence numbers that are no greater than a decoder sequence number; and
   when the packet sequence number is within the sliding window, decoding the coded symbol into one or more of the w input symbols using the coefficient vector.

2. A method according to claim 1, wherein the fixed size of the sliding window was predetermined according to a round-trip time for data traveling between the decoder and an encoder via a data channel.

3. A method according to claim 1, wherein receiving comprises receiving a coded packet having a packet sequence number that is out of order.

4. A method according to claim 1, wherein receiving comprises receiving a plurality of packets including the coded packet and decoding comprises correcting an error in one of the plurality of packets according to a forward error correcting code.

5. A method according to claim 1, wherein decoding comprises decoding according to a systematic code or a linear network code.

6. A method according to claim 1, wherein decoding comprises setting the decoder sequence number equal to the packet sequence number of the received packet when the packet sequence number of the received packet is greater than the decoder sequence number.

7. A method according to claim 1, wherein decoding using the coefficient vector comprises generating a packet erasure when the coefficient vector has a non-zero entry associated with an input symbol whose sequence number is outside the sliding window.

8. A method according to claim 1, wherein decoding using the coefficient vector comprises performing Gaussian elimination on a matrix, one row of which includes the coefficient vector.

9. A method according to claim 8, wherein decoding using the coefficient vector comprises, prior to performing the Gaussian elimination, deleting each row of the matrix that has a non-zero coefficient entry associated with an input symbol whose sequence number is outside the sliding window.

10. A method according to claim 8, wherein performing the Gaussian elimination comprises pivoting on a column of the matrix whose index equals the decoder sequence number modulo the size of the sliding window.

11. A method according to claim 1, further comprising the decoder providing feedback to an encoder via a data channel, thereby enabling the encoder to transmit, via the data channel, one or more packets reencoding any data that the decoder did not decode due to a packet erasure.

12. The method of claim 1 wherein:
   the packet sequency number comprises a largest sequence number of an input symbol used in the encoding of the coded symbol; and
   decoding the coded symbol includes using forward error correction (FEC) based on a latest $f<w$ symbols, wherein one or more symbols within the sliding window and older than the f latest symbols are used for decoding responsive to detecting that one or more of the latest f symbols is missing or cannot be decoded.

13. A decoder for decoding packetized data in the presence of packet erasures, the decoder comprising:
   a buffer for receiving a coded symbol from a coded packet comprising a packet sequence number, a coefficient vector having a fixed length w, and the coded symbol encoded as a linear combination of w input symbols using the coefficient vector;
   a register for storing a decoder sequence number;
   a determining unit for determining whether the packet sequence number is within a sliding window of w consecutive sequence numbers that are no greater than the decoder sequence number stored in the register; and
   a decoding module for decoding, when the determining unit determines that the packet sequence number is within the sliding window, the received coded symbol into one or more of the w input symbols using the coefficient vector.

14. A decoder according to claim 13, wherein the buffer can receive a plurality of symbols including the coded symbol, from a corresponding plurality of packets including the coded packet, and the decoding module can correct an error in one of the plurality of packets according to a forward error correcting code.

15. A decoder according to claim 13, wherein the decoding module can decode according to a systematic code or a linear network code.

16. A decoder according to claim 13, wherein the decoding module can write the packet sequence number of a received packet into the register when the packet sequence number of the received packet is greater than the decoder sequence number stored in the register.

17. A decoder according to claim 13, wherein the decoding module can generate a packet erasure when the coefficient vector has a non-zero entry associated with an input symbol whose sequence number is outside the sliding window.

18. A decoder according to claim 13, further comprising a memory for storing a matrix, wherein the decoding module can store the coefficient vector in one row of the matrix and performing Gaussian elimination on the matrix.

19. A decoder according to claim 18, wherein the decoding module can delete from the memory, prior to performing the Gaussian elimination, each row of the matrix that has a non-zero coefficient entry associated with an input symbol whose sequence number is outside the sliding window.

20. A decoder according to claim 18, wherein the decoding module can perform the Gaussian elimination by pivoting on a column of the matrix whose index equals the decoder sequence number modulo the size of the sliding window.

21. A decoder according to claim 13, further comprising a feedback module capable of providing feedback to an encoder via a data channel, thereby enabling the encoder to transmit, via the data channel, one or more packets reencoding any data that the decoder did not decode due to a packet erasure.

22. The decoder of claim 13 wherein:
the packet sequence number comprises a largest sequence number of an input symbol used in the encoding of the coded symbol;
the decoder sequence number corresponds to a largest packet sequency number received by the decoder;
the sliding window has a fixed size w determined by measuring a round-trip time; and
the decoding module is configured to use forward error correction based on a latest f<w symbols, wherein one or more symbols within the sliding window and older than the f latest symbols are used for decoding responsive to detecting that one or more of the latest f symbols is missing or cannot be decoded.

23. A decoder for decoding packetized data in the presence of packet erasures, the decoder comprising:
receiving means for receiving a coded symbol from a coded packet comprising a packet sequence number, a coefficient vector having a fixed length w, and the coded symbol encoded as a linear combination of w input symbols using the coefficient vector;
storing means for storing a decoder sequence number;
determining means for determining whether the packet sequence number is within a sliding window of w consecutive sequence numbers that are no greater than the decoder sequence number stored in a register; and
decoding means for decoding, when the determining means determines that the packet sequence number is within the sliding window, the received coded symbol into one or more of the w input symbols using the coefficient vector.

* * * * *